US011997283B2

(12) United States Patent
Shanmugam et al.

(10) Patent No.: US 11,997,283 B2
(45) Date of Patent: May 28, 2024

(54) MACHINE LEARNING BASED CONTENT-AWARE IMAGE FRAME ENCODING

(71) Applicant: SONY GROUP CORPORATION, Tokyo (JP)

(72) Inventors: Sankar Shanmugam, Bangalore (IN); Ashwin Kulkarni, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 113 days.

(21) Appl. No.: 17/708,369

(22) Filed: Mar. 30, 2022

(65) Prior Publication Data

US 2023/0319285 A1    Oct. 5, 2023

(51) Int. Cl.
*H04N 19/136*    (2014.01)
*G06T 5/70*    (2024.01)
(Continued)

(52) U.S. Cl.
CPC ............ *H04N 19/136* (2014.11); *G06T 5/70* (2024.01); *G06T 7/50* (2017.01); *G06V 20/52* (2022.01);
(Continued)

(58) Field of Classification Search
CPC .. H04N 19/136; H04N 19/124; H04N 19/154; H04N 19/162; H04N 19/176;
(Continued)

(56) References Cited

U.S. PATENT DOCUMENTS 11,128,832 B1 * 9/2021 Klein .................... G06V 20/46
11,172,209 B2   11/2021 Cheok et al.
(Continued)

FOREIGN PATENT DOCUMENTS

EP          2659674 B1      3/2020
WO      2016/173277 A1    11/2016

OTHER PUBLICATIONS

"Rate Control and H.264", Pixel Tools, Experts In Video Processing, 2022, 08 Pages.
(Continued)

*Primary Examiner* — Michael E Teitelbaum, Ph.D.
(74) *Attorney, Agent, or Firm* — CHIP LAW GROUP

(57) ABSTRACT

An electronic device and method for content-aware image encoding using a machine learning (ML) model are provided. The electronic device receives at least one foreground region and at least one background region from a first image frame. The electronic device determines a set of first macroblocks associated with the detected at least one foreground region and a set of second macroblocks associated with the detected at least one background region, determines a bit allocation control parameter associated with the determined set of second macroblocks, updates the determined bit allocation control parameter based on an application of a first trained ML model, and encodes the first image frame based on the updated bit allocation control parameter to obtain a second image frame so that a first image quality index associated with the first image frame matches a second image quality index associated with the second image frame within a threshold range.

20 Claims, 17 Drawing Sheets

(51) Int. Cl.
*G06T 7/50* (2017.01)
*G06V 20/52* (2022.01)
*H04N 19/124* (2014.01)
*H04N 19/154* (2014.01)
*H04N 19/162* (2014.01)
*H04N 19/176* (2014.01)
*H04N 19/42* (2014.01)

(52) U.S. Cl.
CPC .......... *H04N 19/124* (2014.11); *H04N 19/154* (2014.11); *H04N 19/162* (2014.11); *H04N 19/176* (2014.11); *H04N 19/42* (2014.11); *G06T 2207/20081* (2013.01); *G06T 2207/30232* (2013.01)

(58) Field of Classification Search
CPC ........... H04N 19/42; G06T 5/002; G06T 7/50; G06T 2207/20081; G06T 2207/30232; G06V 20/52
See application file for complete search history.

(56) References Cited

U.S. PATENT DOCUMENTS

| | | | |
|---|---|---|---|
| 11,436,699 B1* | 9/2022 | Wu | G06T 3/40 |
| 2006/0056717 A1* | 3/2006 | Cheung | H04N 19/27 |
| | | | 375/E7.077 |
| 2010/0124274 A1* | 5/2010 | Cheok | H04N 7/18 |
| | | | 375/E7.125 |
| 2013/0128952 A1* | 5/2013 | Kwon | H04N 19/115 |
| | | | 375/240.02 |
| 2019/0394466 A1* | 12/2019 | Gao | H04N 19/172 |

OTHER PUBLICATIONS

Dhruv Parthasarathy, "A Brief History of CNNs in Image Segmentation: From R-CNN to Mask R-CNN", Apr. 22, 2017, 20 Pages.
Adrian Rosebrock, "Blur detection with OpenCV", Pyimagesearch, Sep. 7, 2015, 23 Pages.

\* cited by examiner

MACHINE LEARNING BASED CONTENT-AWARE IMAGE FRAME ENCODING

CROSS-REFERENCE TO RELATED APPLICATIONS/INCORPORATION BY REFERENCE

None.

FIELD

Various embodiments of the disclosure relate to machine learning (ML) based content-aware image encoding. More specifically, various embodiments of the disclosure relate to an electronic device and method for content-aware image encoding based on machine learning.

BACKGROUND

In recent years, usage of high-resolution image and video technology has grown exponentially in many fields of application, such as content streaming, surveillance, and personal media storage. Advancements in the field of high-resolution video technology has led to increased demand for high network bandwidths and data storage spaces. Several coding techniques exist to encode and process the high-resolution videos. Conventionally, these coding techniques distribute bitrate across all macroblocks of an image frame of the high-resolution video based on the complexity of content in the image frame. For example, traditional techniques for adaptive network streaming may degrade the video data in the form of size reduction or quality degradation across the entire frame. Such techniques may result in loss of useful data and degraded viewing experience because the encoded video data may be reproduced at low resolutions (e.g. 240p or 360p) or low bitrates (10 KBps or 20 KBps) based on a network bandwidth at the receiver side.

A surveillance system may use multiple cameras that generate huge amounts of video data. This may require a huge network bandwidth to transmit and feed the video data from the multiple cameras through processing blocks of the surveillance system. In the personal media storage scenario, when a memory constrained device such as smart phone or digital camera has reached its memory capacity, new files cannot be accommodated without deleting existing files each time, which may be inconvenient.

Limitations and disadvantages of conventional and traditional approaches will become apparent to one of skill in the art, through comparison of described device with some aspects of the present disclosure, as set forth in the remainder of the present application and with reference to the drawings.

SUMMARY

A device and method for content-aware image encoding using a machine learning (ML) model are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
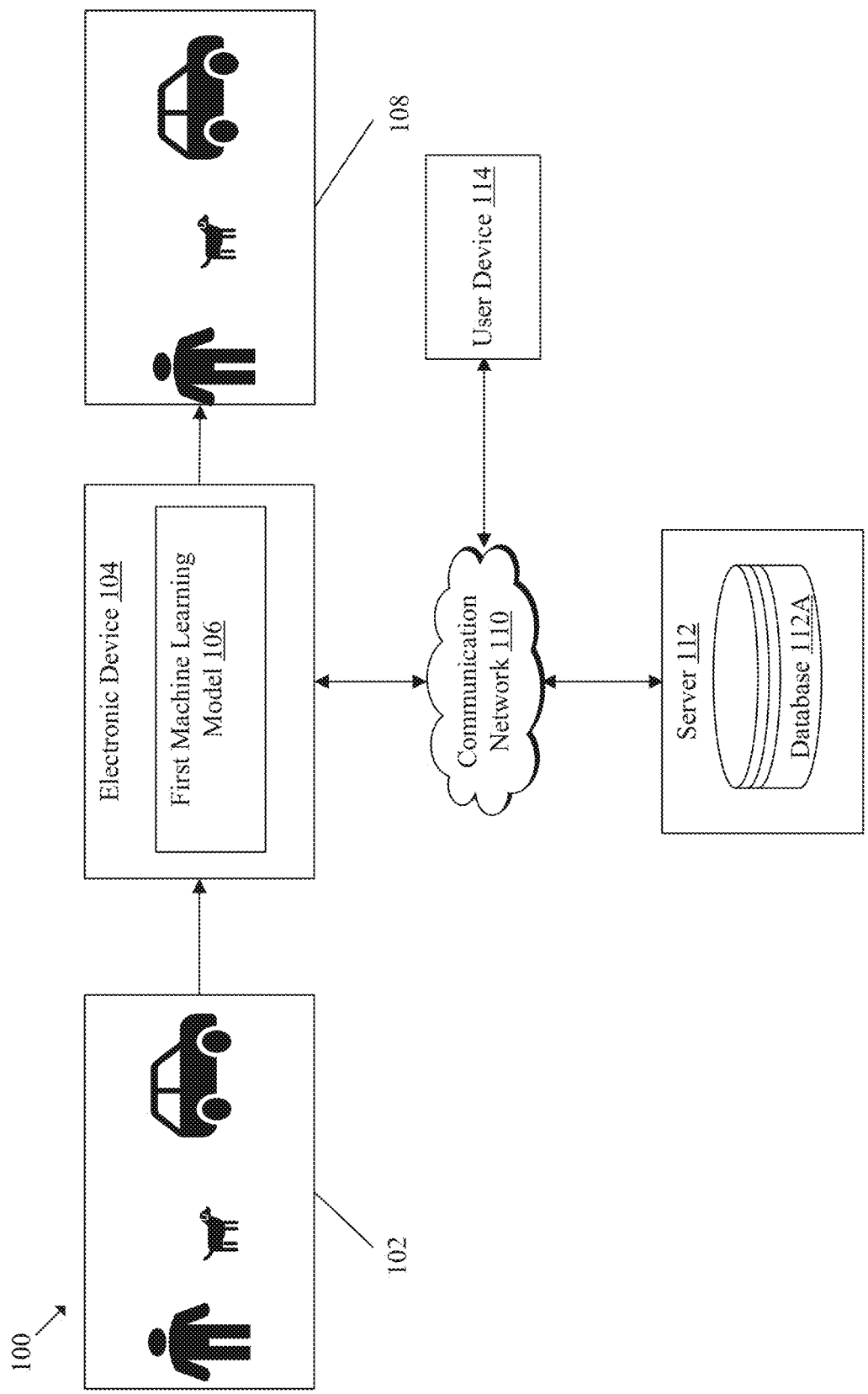
FIG. 1 is a diagram of an exemplary network environment for content-aware image encoding using a machine learning (ML) model, in accordance with an embodiment of the disclosure.

The following described implementations may be found in the disclosed electronic device and method for content-aware image encoding using a machine learning (ML) model. The electronic device may be configured to detect at least one foreground region (e.g. a region of interest) and at least one background region from a first image frame of a video. The region of interest may be a detected object, a focused region, or a region of a selective depth range in the first image frame. The electronic device may be configured to determine, from the first image frame, a set of first macroblocks associated with the detected at least one foreground region (e.g. the region of interest) and a set of second macroblocks associated with the detected at least one background region. The electronic device may be configured to determine a bit allocation control parameter associated with the determined set of second macroblocks. For example, the bit allocation control parameter may comprise, but is not limited to, a bit-rate control parameter that corresponds to at least one of a quantization parameter (QP) or an entropy coding parameter. The electronic device may be configured to update the determined bit allocation control parameter associated with the set of second macroblocks based on an application of a first trained machine learning model. The electronic device may be configured to encode the first image frame based on the updated bit allocation control parameter to obtain a second image frame, wherein a first image quality index (e.g. a structural similarity index measure (SSIM)) associated with the first image frame matches a second image quality index (e.g. SSIM) associated with the second image frame within a threshold range.

For example, the electronic device may be configured to determine a network bandwidth associated with a video stream that includes the first image frame. The electronic device may be configured to update of the bit allocation control parameter associated with the determined set of second macroblocks (e.g. background macroblocks) based on a bit rate compatible with the determined network bandwidth. The electronic device may reduce the bit allocation of the background macroblocks until a structural pattern of the compressed second image frame matches the structural pattern of the original first image frame within the threshold range. The electronic device may be configured to compress the first image frame based on the updated bit allocation control parameter. The electronic device may thereby provide a content-aware encoding technique by updating the bit allocation control parameter of the background macroblocks associated with the background region to selectively reduce the bit allocation of the background region until the SSIM of the second image frame matches the SSIM of the original first image frame within the threshold range, and to maintain the original or default bit allocation of the foreground region (e.g. the region of interest). Based on the selective reduction of the bit allocation of the background region, the electronic device may compress the video to be compatible with the available network bandwidth while maintaining the original high resolution of the foreground region (e.g. the region of interest) in the video, to thereby avoid degradation of the image quality of the region of interest in the video and to enhance viewing experience.

The electronic device may be configured to detect a set of objects from the first image frame based on an application of a second trained machine learning model on the first image frame such that the detected at least one foreground region (e.g. the region of interest) corresponds to the detected set of objects, and the detected at least one background region corresponds to a region other than the detected at least one foreground region in the first image frame. In an embodiment, the electronic device may be configured to select at least one object of the detected set of objects as the at least one background region based on at least one of a user input or a system preference. The electronic device may be configured to determine a focal blur value associated with each region of a plurality of regions of the first image frame, such that the focal blur value associated with the detected at least one foreground region is above a predetermined threshold, and the focal blur value associated with the detected at least one background region is below the predetermined threshold. For example, the focal blur value is determined based on an application of one of a Laplacian operator or any blur computing technique on the first image frame. The electronic device may be configured to determine a depth map associated with the first image frame. The electronic device may be configured to detect the at least one foreground region (e.g. the region of interest) and the at least one background region based on a selective depth range in the determined depth map. The electronic device may thereby detect the region of interest in the first image frame based on different techniques.

The electronic device may be configured to determine, as the updated bit allocation control parameter, an updated quantization parameter between a minimum threshold quantization parameter and a default quantization parameter based on the application of the first trained machine learning model such that the minimum threshold quantization parameter is a quantization parameter value that maintains the second image quality index of the second image frame.

The electronic device may be configured to detect a set of objects from the first image frame. For example, the first image frame may correspond to a surveillance video that includes a set of image frames. In an example, the detected at least one foreground region may correspond to the detected set of objects and the detected at least one background region may correspond to a region other than the detected at least one foreground region in the first image frame. The electronic device may be configured to compress the surveillance video based on the encoding of the first image frame. The electronic device may be configured to track the detected set of objects in the set of image frames and may control an image capture device associated with the surveillance video based on the tracking of the detected set of objects. The electronic device may thereby compress the surveillance video by selectively reducing the bit allocation of the background region, while retaining the original quality of the foreground region (e.g. the detected set of objects) in which a user of a surveillance system is more interested. Based on the compression, the electronic device may thereby reduce bandwidth required to transmit the video data from multiple cameras and to feed the video data through processing blocks of the surveillance system.

The electronic device may be configured to select a file, from a set of files, stored in a memory device. For example, the selected file may include an image or a video, and the first image frame may correspond to the selected file. The electronic device may be configured to compress the selected file based on the encoding of the first image frame. In an example, the selection of the file from the set of files is based on a time of creation of the file, a time of modification of the file, one of a time or a frequency of access of the file, a user input associated with the file, or any other recommended criteria. The electronic device may compress the file (e.g. the image or the video) in the memory device while retaining the original quality of the region of interest in the image or the video, which leads to file size reduction. The compression of the file may thereby eliminate the need to delete existing files to accommodate new files in the memory device when the memory device is full or reaches "memory full" warning stage.

FIG. 1 is a diagram of an exemplary network environment for content-aware image encoding using a machine learning (ML) model, in accordance with an embodiment of the disclosure. With reference to FIG. 1, there is shown a block diagram of a network environment 100. In the network environment 100, there is shown an electronic device 104 that may include a first machine learning model 106. In the network environment 100, there is further shown a server 112 that may include a database 112a. In the network environment 100, there is further shown a user device 114. Further, the network environment 100 may include a communication network 110 through which the electronic device 104, the user device 114, and the server 112 may communicate with each other. In FIG. 1, there is further shown a first image frame (e.g. an input image frame 102) which is input to the electronic device 104 and a second image frame (e.g. an output image frame 108) that is output from the electronic device 104.

The electronic device 104 may include suitable logic, circuitry, and interfaces that may be configured to receive the input image frame 102, detect at least one foreground region and at least one background region from the input image frame 102, update the bit allocation control parameter associated with macroblocks of the background region of the input image frame 102 based on an application of the first machine learning model 106, and encode the input image frame 102 based on the updated bit allocation control parameter to generate the output image frame 108 such that a first image quality index associated with the input image frame 102 matches a second image quality index associated with the output image frame 108 within the threshold range. Examples of the electronic device 104 may include, but are not limited to, a server-side encoder or a client-side encoder, a mobile device, a desktop computer, a laptop, a computer workstation, a computing device, a mainframe machine, a server, such as a cloud server, a cloud server, an application server, a group of servers, a relay, a smart surveillance server, or any device capable of encoding image frames. In an embodiment, the electronic device 104 may provide the functionality of selective bit allocation and encoding as a cloud based service or as a client side application. In another example, the electronic device 104 may be communicatively coupled with the server 112 (such as a content streaming server) to receive video for encoding content at different bit rates for adaptive bitrate streaming. In another embodiment, the electronic device 104 may be integrated with the server 112 (such as the content streaming server) for encoding content at different bit rates for adaptive bitrate streaming. In another example, the electronic device 104 may include an encoding device integrated to an imaging device (such as a surveillance camera) or an encoding device communicatively coupled to the imaging device. The electronic device 104 may be implemented using hardware including, but not limited to, a processor, a microprocessor (e.g., to perform or control performance of one or more operations), a field-programmable gate array (FPGA), or an application-specific integrated circuit (ASIC). In some other instances, the electronic device 104 may be implemented using a combination of hardware and software.

In an embodiment, the at least one foreground region of the input image frame 102 may correspond to a region of the input image frame 102 that includes objects of interest. In an example, the at least one foreground region of the input image frame 102 may correspond to a region of interest to a user of the input image frame 102. The at least one background region of the input image frame 102 may correspond to a region of the input image frame 102 other than the at least one foreground region. In an embodiment, the input image frame 102 may include a plurality of macroblocks. In an example, a size of each macroblock of the plurality of macroblocks may include, but is not limited to, 2×2 pixels, 4×4 pixels, 8×8 pixels, 8×4 pixels, 16×16 pixels, or 16×8 pixels. The plurality of macroblocks may include the set of first macroblocks associated with the at least one foreground region and the set of second macroblocks associated with the at least one background region.

The first machine learning model 106 may be a regression model which may be trained to identify a relationship between inputs, such as features in a training dataset and output labels. The first machine learning model 106 may be defined by its hyper-parameters, for example, number of weights, cost function, input size, number of layers, and the like. The hyper-parameters of the first machine learning model 106 may be tuned and weights may be updated to move towards a global minima of a cost function for the first machine learning model 106. After several epochs of the training on the feature information in the training dataset, the first machine learning model 106 may be trained to output a prediction result for a set of inputs. The prediction result may be indicative of a class label for each input of the set of inputs. For example, the first machine learning model 106 may be trained to determine the bit allocation control parameter (e.g. quantization parameter (QP) value) associated with the set of second macroblocks, based on a plurality of parameters (such as network condition, SSIM value, foreground to background percentage, default QP value, etc.) as input, details of which are further described, for example, with reference to FIG. 11B.

The plurality of layers of the first machine learning model 106 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the first machine learning model 106. Outputs of each hidden layer may be coupled to inputs of at least one node in other layers of the first machine learning model 106. Node(s) in the final layer may receive inputs from at least one hidden layer to output a result. The number of layers and the number of nodes in each layer may be determined from hyper-parameters of the first machine learning model 106. Such hyper-parameters may be set before, while training, or after training the first machine learning model 106 on a training dataset.

Each node of the first machine learning model 106 may correspond to a mathematical function (e.g. a sigmoid function or a rectified linear unit) with a set of parameters, tunable during training of the first machine learning model 106. The set of parameters may include, for example, a weight parameter, a regularization parameter, and the like. Each node may use the mathematical function to compute an output based on one or more inputs from nodes in other layer(s) (e.g. previous layer(s)) of the first machine learning model 106. All or some of the nodes of the first machine learning model 106 may correspond to the same or a different mathematical function.

In accordance with an embodiment, the electronic device 104 may train the first machine learning model 106 on a training dataset. The training dataset may include a default quantization parameter associated with the set of second macroblocks, a modified quantization parameter associated with the set of second macroblocks, a foreground occupancy percentage in a set of image frames, a background occupancy percentage in the set of image frames, a quantization parameter divisor, a bit consumption associated with the determined set of second macroblocks, an available network bandwidth for transmission of the first image frame to a receiving device (e.g. user device 114), and so on. For example, the electronic device 104 may input the training dataset to train the first machine learning model 106. Details of the training of the first machine learning model 106 are further described, for example, in FIG. 11A.

In training the first machine learning model 106, one or more parameters of each node of the first machine learning model 106 may be updated based on whether an output of the final layer for a given input (from the training dataset) matches a correct result based on a loss function for the first machine learning model 106. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The first machine learning model 106 may include electronic data, which may be implemented as, for example, a software component of an application executable on the electronic device 104. The first machine learning model 106 may rely on libraries, external scripts, or other logic/instructions for execution by a processing device, such as the electronic device 104. The first machine learning model 106 may include code and routines, which when executed a processor, enable a computing device, such as the electronic device 104 to perform one or more operations, such as updating the bit allocation control parameter associated with the set of second macroblocks. Additionally or alternatively, the first machine learning model 106 may be implemented using hardware including, but not limited to, a processor, a microprocessor (e.g., to perform or control performance of one or more operations), a field-programmable gate array (FPGA), or an application-specific integrated circuit (ASIC). Alternatively, in some embodiments, the ML model may be implemented using a combination of hardware and software.

In some embodiments, the first machine learning model 106 may be a neural network model. Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the learning engine may include numerical computation techniques using data flow graphs. In certain embodiments, the first machine learning model 106 may be based on a hybrid architecture of multiple Deep Neural Networks (DNNs).

The communication network 110 may include a communication medium through which the electronic device 104, the user device 114, and the server 112 may communicate with each other. The communication network 110 may be one of a wired connection or a wireless connection. Examples of the communication network 110 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The server 112 may comprise suitable logic, circuitry, interfaces, and code that may be configured to store a plurality of videos for adaptive bitrate streaming. For example, the server 112 may be a media server or content server configured to provide a media streaming service. The server 112 may be communicatively coupled with the electronic device 104 to implement a content delivery network. In another example, the server may be a file hosting server configured to provide a file hosting service. The server 112 may receive a request from the electronic device 104 or the user device 114 to retrieve a video or an image stored in the database 112a. In an embodiment, the server 112 may be further configured to generate training data (such as labeled data for object detection and determining bit allocation parameter) for the first machine learning model 106. In an embodiment, the server 112 may be configured to store object detection data for detection of objects in the input image frame 102 of the video. The server 112 may be further configured to transmit the first machine learning model 106 along with the training data to the electronic device 104. The server 112 may be implemented as a cloud server which may execute operations through web applications, cloud applications, HTTP requests, repository operations, file transfer, and the like. Other examples of the server 112 may include, but are not limited to a database server, a file server, a web server, a media server, an application server, a mainframe server, a cloud server, or other types of servers. In one or more embodiments, the server 112 may be implemented as a plurality of distributed cloud-based resources by use of several technologies that are well known to those skilled in the art. A person with ordinary skill in the art will understand that the scope of the disclosure may not be limited to implementation of the server 112 and the electronic device 104 as separate entities. In certain embodiments, the functionalities of the electronic device 104 may be incorporated in its entirety or at least partially in the server 112, without departing from the scope of the disclosure.

The database 112a may include suitable logic, interfaces, and/or code that may be configured to store a plurality of videos or a plurality of image frames including the input image frame 102 associated with a media streaming service or a file hosting service. Though not shown in FIG. 1, in some cases, the database 112a may store the first machine learning model 106 alternatively, or in addition to, the storage on the electronic device 104. The database 112a may be a relational or a non-relational database. Also, in some cases, the database 112a may be cached and stored on the electronic device 104. The server 112 of the database 112a may be configured to receive a request for content (e.g. a video or one or more image frames) from the electronic device 104 or the user device 114, via the communication network 110. In response to the request, the server 112 may be configured to retrieve the content from the database 112a and provide the retrieved content to the electronic device 104, via the communication network 110. In some embodiments, the database 112a may include a distributed storage that may store data across different locations. In an embodiment, the database 112a may be implemented using hardware including a processor, a microprocessor (e.g., to perform or control performance of one or more operations), a field-programmable gate array (FPGA), or an application-specific integrated circuit (ASIC). In some other instances, the database 112a may be implemented using a combination of hardware and software.

The user device 114 may include suitable logic, circuitry, interfaces, and/or code that may be configured to generate, store, or receive a set of files. For example, the set of files includes an image or a video. For example, the user device 114 may include a client software or an electronic mail software, through which the user device 114 may receive the set of files. In another example, the user device 114 may include an imaging device that may capture the image or the video along with metadata (e.g. object detected region, depth information, etc.). Additionally, the user device 114 may include an image editing or processing software through which the set of files may be generated based on user input. In an embodiment, the user device 114 may transfer the generated or received set of files along with the metadata to the electronic device 104 for compression. In another embodiment, the user device 114 may transfer the generated or received set of files to the database 112a for storage. The user device 114 may further send a request to the electronic device 104 to initiate coding of a user selected file from the set of files. In an example, the electronic device 104 may be configured to select the file from the set of files stored in the user device 114 based on user input, and may compress the selected file based on encoding of the selected file. Examples of the user device 114 may include, but are not limited to, a mobile device, a desktop computer, a laptop, a computer workstation, a computing device, a mainframe machine, and so on.

In operation, the electronic device 104 may receive an input image frame 102 and information associated with a network condition at a receiver device (e.g. user device 114). In an example, the input image frame 102 may be received from the database 112a. In an embodiment, the electronic device 104 may determine a network bandwidth (e.g. a low bandwidth) available for transmission of a video stream that includes the input image frame 102, and may initiate coding and compression of the input image frame 102 based on the determined low network bandwidth. The electronic device 104 may detect the at least one foreground region and the at least one background region from the input image frame 102. The details of separation of the at least one foreground region and the at least one background region are described, for example, in FIGS. 3-6. The electronic device 104 may utilize object detection, focal blur value detection, or a selective depth range in a depth map of the input image frame 102 to detect the at least one foreground region and the at least one background region in the input image frame 102. In an embodiment, a combination of the object detection, the focal blur value detection, or the selective depth range in the depth map may be used to detect the at least one foreground region and the at least one background region in the input image frame 102, as further described, for example, in FIG. 3.

According to an embodiment, the electronic device 104 may determine a set of first macroblocks associated with the at least one foreground region and a set of second macroblocks associated with the at least one background region in the input image frame 102. The input image frame 102 may include a plurality of macroblocks. Each macroblock of the plurality of macroblocks may be associated with one of the at least one foreground region or the at least one background region. The electronic device 104 may classify each macroblock of the plurality of macroblocks included in the input image frame 102 into one of the at least one foreground region or the at least one background region.

According to an embodiment, the electronic device 104 may determine the bit allocation control parameter (e.g. a quantization parameter (QP) or an entropy encoding parameter, etc.) associated with the set of second macroblocks (e.g. background macroblocks). The electronic device 104 may update the bit allocation control parameter associated with the determined set of second macroblocks based on the application of the first machine learning model 106. For example, the electronic device 104 may update the bit allocation control parameter associated with the determined set of second macroblocks (e.g. background macroblocks) based on a bit rate compatible with the determined network bandwidth. The electronic device 104 may then encode the input image frame 102 based on the updated bit allocation control parameter such that the first image quality index associated with the first image frame matches the second image quality index associated with the second image frame within a threshold range.

In an embodiment, the electronic device 104 may iteratively update the bit allocation control parameter for the set of second macroblocks until the image quality index (e.g. SSIM) associated with the output image frame 108 matches the image quality index (e.g. SSIM) of the output image frame 108 within the threshold range. For example, the bit allocation control parameter may be iteratively reduced until the structural pattern of the output image frame 108 matches the structural pattern of the output image frame 108 within the threshold range. In other words, the electronic device 104 may iteratively reduce the bit allocation control parameter for the set of second macroblocks until the image degradation of the background region is within acceptable limits in accordance with SSIM or other image quality metrics (e.g. peak signal-to-noise ratio (PSNR)). Based on the selective reduction of the bit allocation of the background region, the electronic device 104 may compress the video based on the determined low network bandwidth, while maintaining the original high resolution of the foreground region (e.g. the region of interest) in the video, to thereby avoid degradation of the image quality of the region of interest in the video and to enhance viewing experience.

In accordance with an embodiment, the electronic device 104 may be configured to detect a set of objects from the input image frame 102. For example, the input image frame 102 may correspond to a surveillance video that includes a set of image frames. In an example, the detected at least one foreground region may correspond to the detected set of objects and the detected at least one background region may correspond to a region other than the detected at least one foreground region in the input image frame 102. In an embodiment, the electronic device 104 may be configured to select at least one object of the detected set of objects as the at least one background region based on at least one of a user input or a system preference. The electronic device 104 may be configured to compress the surveillance video based on the encoding of the input image frame 102. The electronic device may be configured to track the detected set of objects in the set of image frames and control an image capture device associated with the surveillance video based on the tracking of the detected set of objects. The electronic device 104 may thereby compress the surveillance video by selectively reducing the bit allocation of the background region, while retaining the original bit allocation for the foreground region (e.g. the detected set of objects) in which a user of a surveillance system is more interested. Based on the compression, the electronic device 104 may thereby reduce bandwidth usage required to feed the video data from multiple cameras through processing blocks of the surveillance system.

In accordance with an embodiment, the electronic device 104 may be configured to select a file, from a set of files, stored in a memory device. The electronic device 104 may receive a user input indicative of a region of interest in the selected file. In an embodiment, the electronic device 104 may automatically determine the region of interest in the selected file based on object detection, focused region, or a specific depth range. For example, the selected file may include an image or a video, and the input image frame 102 may correspond to the selected file. The electronic device 104 may be configured to compress the selected file based on the encoding of the input image frame 102. In an example, the selection of the file from the set of files is based on a time of creation of the file, a time of modification of the file, one of a time or a frequency of access of the file, a user input associated with the file, or any other recommended criteria. The electronic device 104 may compress the file (e.g. the image or the video) in the memory device, while retaining the original quality of the region of interest in the image or the video. The compression of the file may lead to file size reduction, thereby eliminating the need to delete existing files to accommodate new files in the memory device when the memory device is full or reaches "memory full" warning stage.

Figure 2:
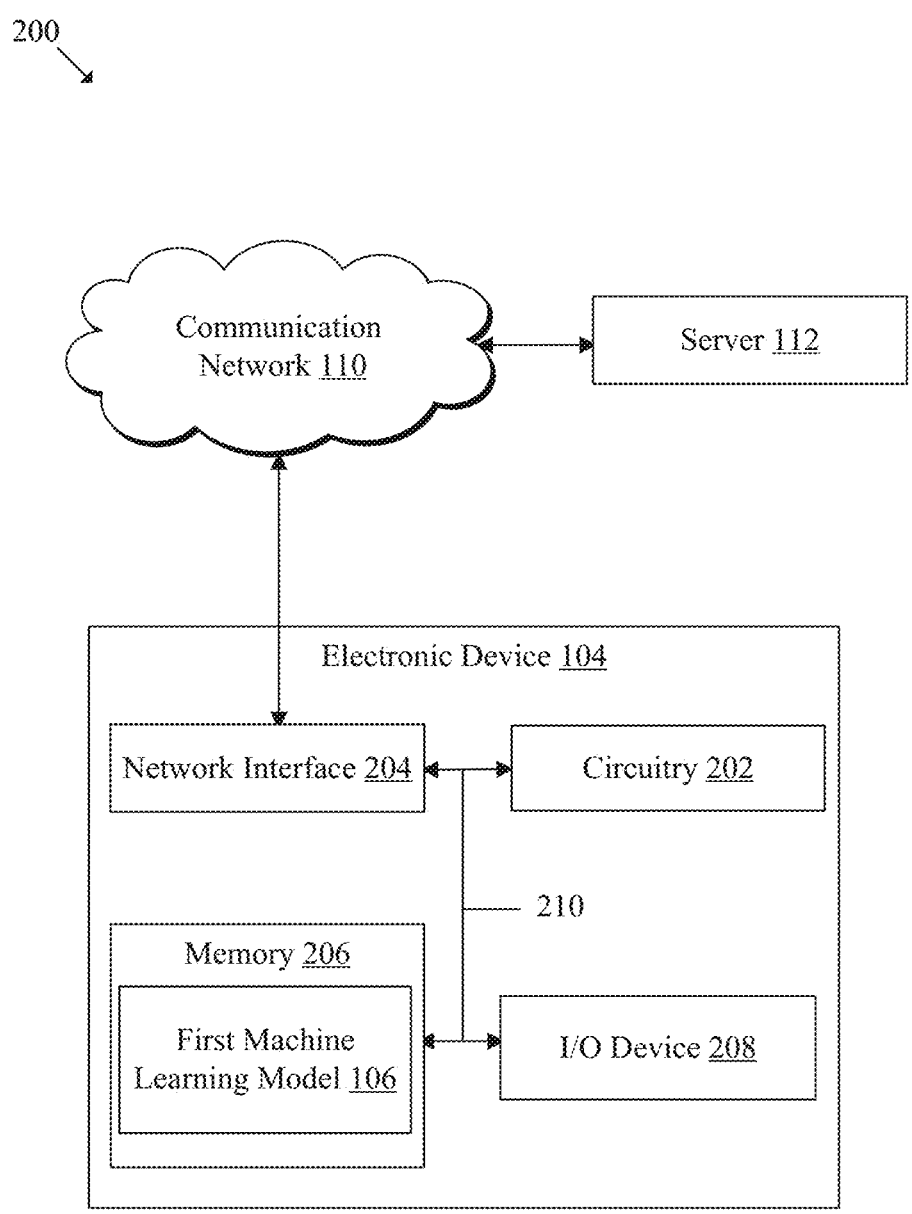
FIG. 2 is an exemplary block diagram of an electronic device for content-aware image encoding using a machine learning (ML) model, in accordance with an embodiment of the disclosure.

FIG. 2 is an exemplary block diagram of an electronic device for content-aware image encoding using a machine learning (ML) model, in accordance with an embodiment of the disclosure. FIG. 2 is explained in conjunction with elements from FIG. 1. With reference to FIG. 2, there is shown a block diagram 200. In the block diagram 200, there is shown circuitry 202 and a memory 206. The memory 206 may include the first machine learning model 106. In the block diagram 200, there is further shown an input/output (I/O) device 208 and a network interface 204.

The circuitry 202 may include suitable logic, circuitry, and interfaces that may be configured to execute instructions associated with different operations to be executed by the electronic device 104. For example, some of the operations may include detection of the at least one foreground region and the at least one background region from the input image frame 102, determination of the set of first macroblocks associated with the detected at least one foreground region and the set of second macroblocks associated with the detected at least one background region, determination of the bit allocation control parameter associated with the determined set of second macroblocks, updating of the determined bit allocation control parameter based on the application of the first trained machine learning model 106, and encoding of the input image frame 102 based on the updated bit allocation control parameter to obtain the output image frame 108. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on processor technologies known in the art. Examples of implementations of the circuitry 202 may include, but not limited to, an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The network interface 204 may include suitable logic, circuitry, and interfaces that may be configured to facilitate communication between the circuitry 202, the server 112, and the user device 114 via the communication network 110. The network interface 204 may be implemented by use of various known technologies to support wired or wireless communication of the electronic device 104 with the communication network 110. The network interface 204 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 204 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The memory 206 may include suitable logic, circuitry, and interfaces that may be configured to store the one or more instructions to be executed by the circuitry 202. The memory 206 may be configured to store the input image frame 102, encoded intermediate image frames, or the output image frame 108. The memory 206 may be further configured to store the first machine learning model 106 and the training dataset of the first machine learning model 106. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from a user, and provide an output based on the received input. The I/O device 208 which may include various input and output devices, may be configured to communicate with the circuitry 202 via signal bus 210. In another example, the electronic device 104 may receive, via the I/O device 208, the user input indicative of a selection of a file (e.g. video or image) as the input image frame 102 from the set of files stored in the user device 114 or the memory 206. Examples of the I/O device 208 may include, but are not limited to, a touch screen, a keyboard, a mouse, a joystick, a microphone, a display device, and a speaker.

A person of ordinary skill in the art will understand that the electronic device 104 may also include other suitable components, in addition to the components which are illustrated herein to describe and explain the function and operation of the present disclosure. A detailed description for the other components of the electronic device 104 has been omitted from the disclosure for the sake of brevity.

Figure 3:
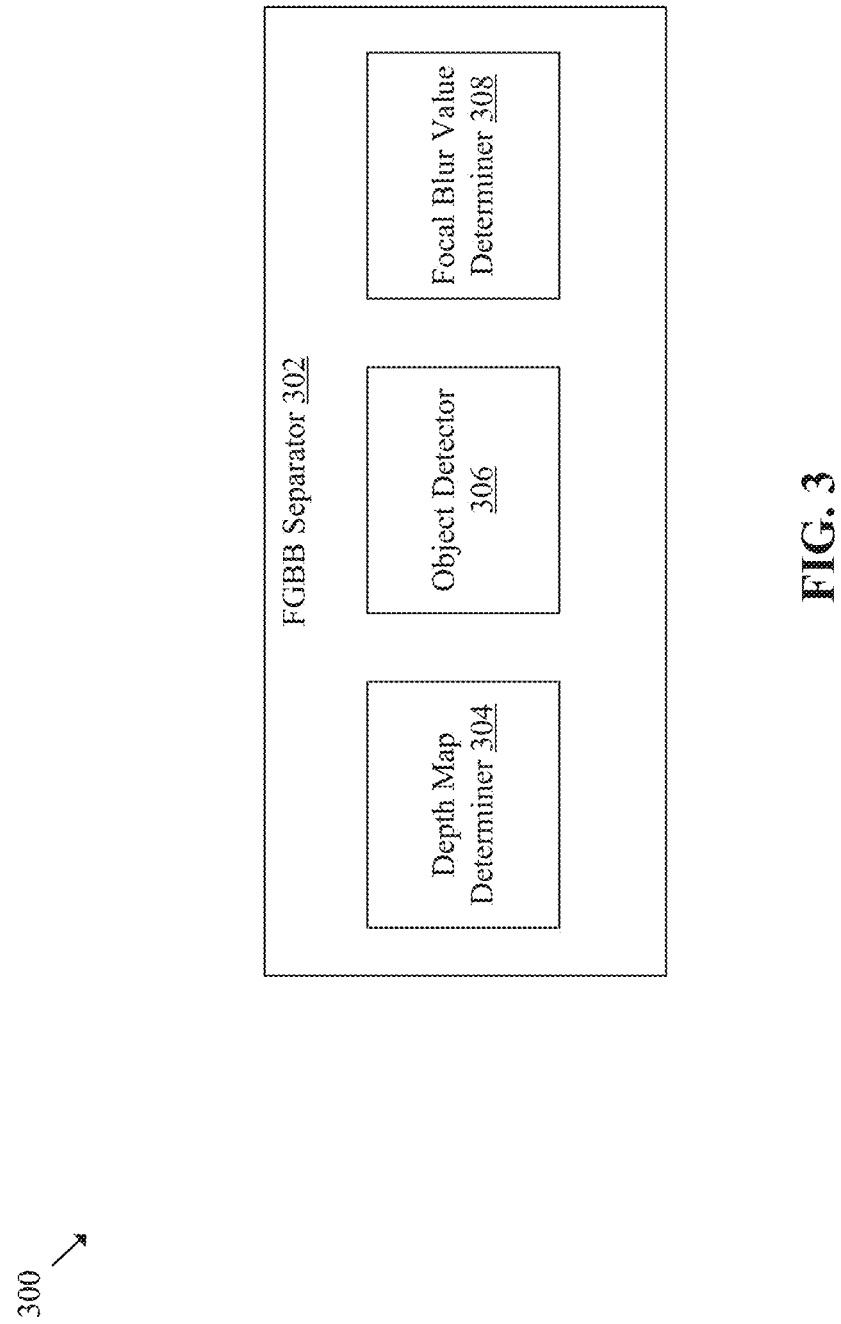
FIG. 3 is a diagram that illustrates an exemplary environment for foreground-background separation, in accordance with an embodiment of the disclosure.

FIG. 3 is a diagram that illustrates an exemplary environment for foreground-background separation, in accordance with an embodiment of the disclosure. FIG. 3 is explained in conjunction with elements from FIGS. 1 and 2. With reference to FIG. 3, there is shown a block diagram 300. In the block diagram 300, there is shown the foreground-background (FGBG) separator 302 that may include a depth map determiner 304, an object detector 306, and a focal blur value determiner 308. In an example, the circuitry 202 may execute a trained second machine learning model to implement the FGBG separator 302. Based on the application scenario, the circuitry 202 may execute the depth map determiner 304, the object detector 306, and the focal blur value determiner 308 individually to detect the at one foreground, or may execute the depth map determiner 304, the object detector 306, and the focal blur value determiner 308 in combination to detect the at one foreground.

Figure 6:
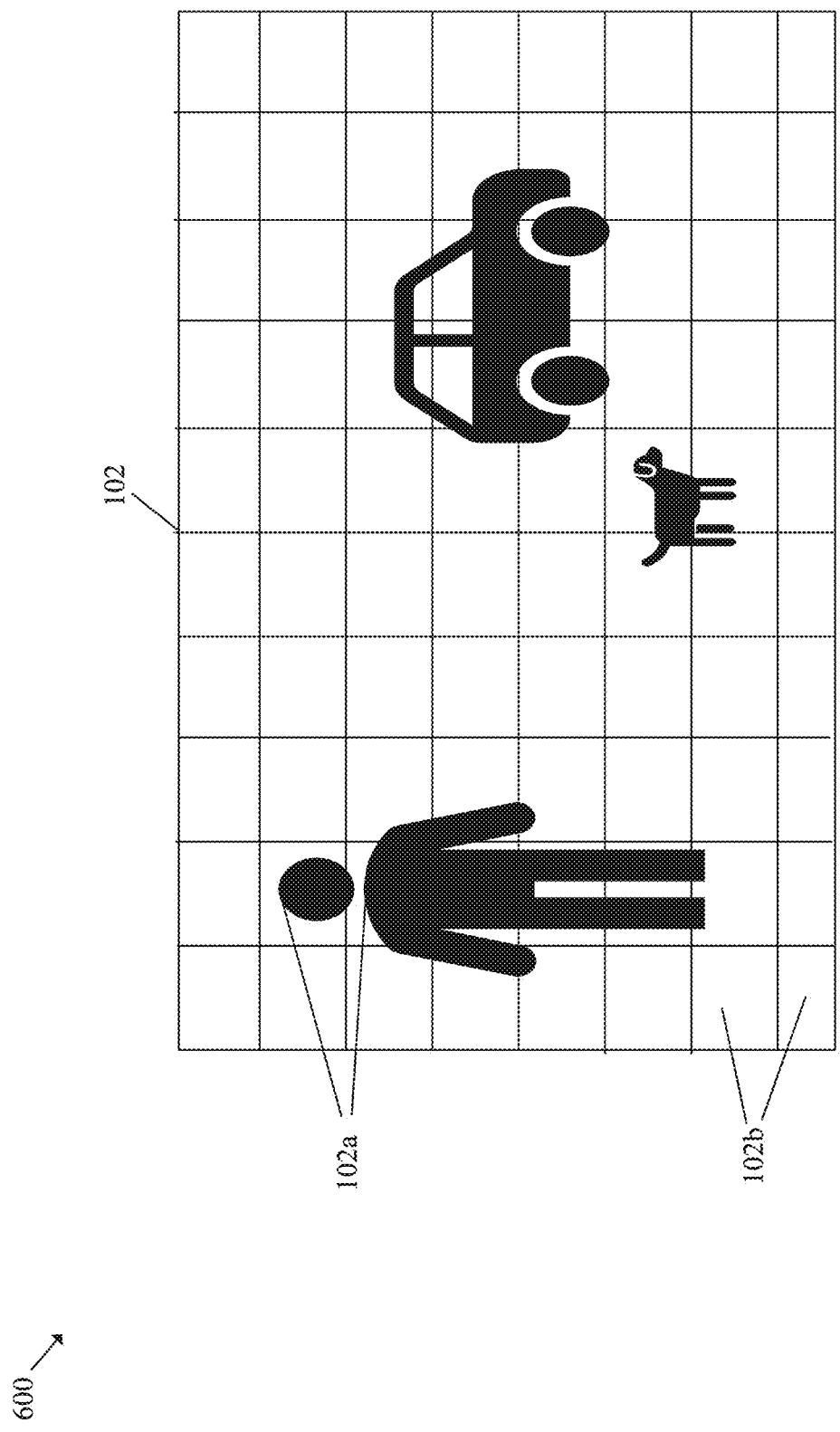
FIG. 6 is a diagram that illustrates foreground and backgrounds macroblocks in an image frame based on foreground-background separation, in accordance with an embodiment of the disclosure.

In an embodiment, the circuitry 202 may control the FGBG separator 302 to receive the input image frame 102. The circuitry 202 may control the FGBG separator 302 to determine a plurality of macroblocks 102a and 102b in the input image frame 102, as shown in FIG. 6. Each macroblock of the plurality of macroblocks includes a set of pixels. The size of each macroblock of the plurality of macroblocks 102a and 102b may include, but is not limited to, 2×2 pixels, 4×4 pixels, 8×8 pixels, or 16×16 pixels. The circuitry 202 may control the FGBG separator 302 to detect at least one foreground region and at least one background region in the input image frame 102. The FGBG separator 302 may output a set of first macroblocks 102a associated with the at least one foreground region and a set of second macroblocks 102b associated with the at least one background region. The at least one foreground region may include objects of interest corresponding to an application scenario. For example, in case of a streaming video, the object of interest may be a central character (e.g. a person, an animal, etc.) in the input image frame 102 or may be designated in the metadata received with the streaming video. In case of a surveillance system, the object of interest may include moving objects or objects designated by a user of the surveillance system. Examples of objects of interest corresponding to the at least one foreground region may include, but are not limited to, a person, an animal, a vehicle, a building, or any object in which the user may be interested. Further, the foreground region may correspond to a set of macroblocks in the input image frame 102 in which one or more objects of interest is present. In another embodiment, the foreground region may correspond to a region in the input image frame 102 with a specific focal blur value. In another embodiment, the foreground region may correspond to a selective depth range in a depth map associated with the input image frame 102.

Figure 4:
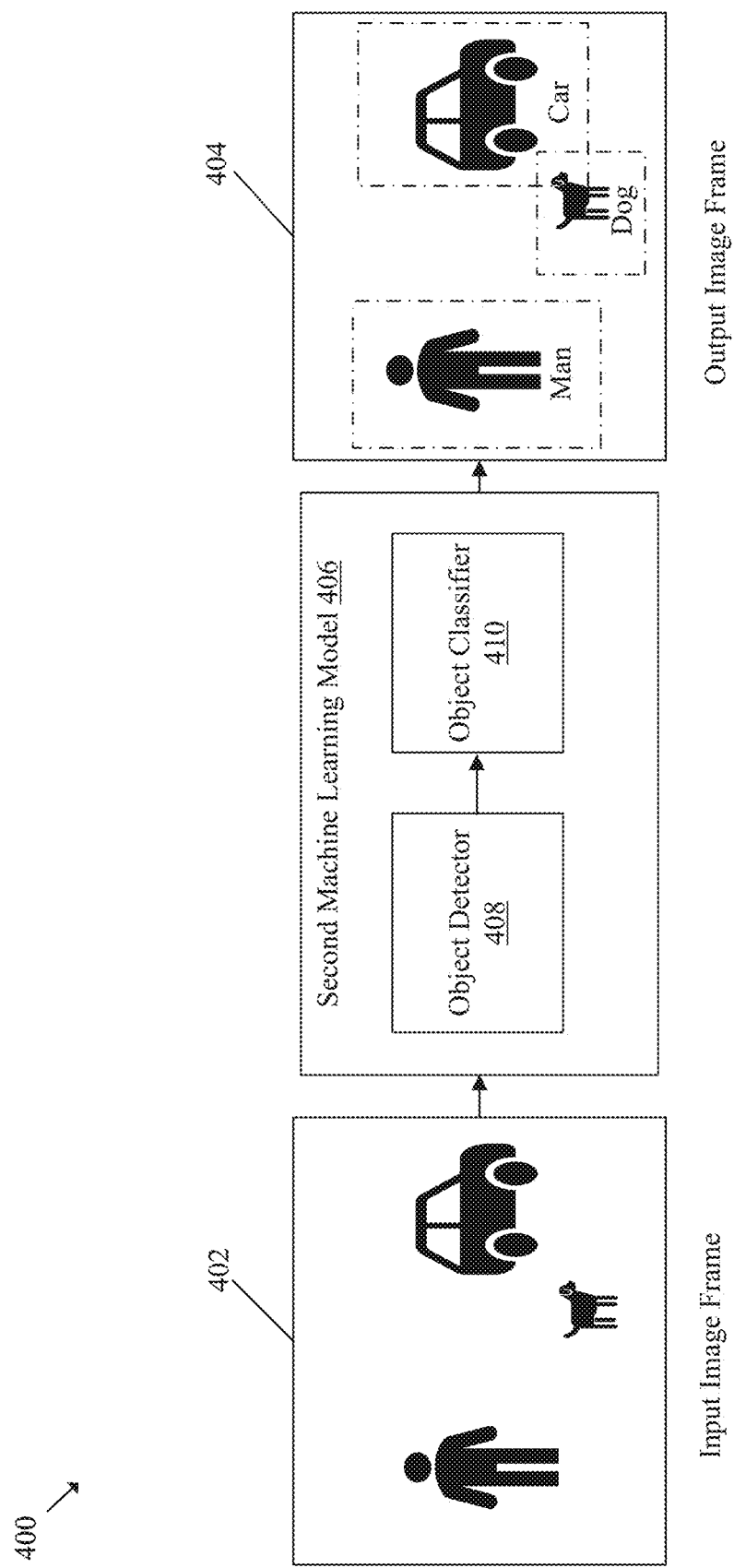
FIG. 4 is a diagram that illustrates an exemplary environment for object detection, in accordance with an embodiment of the disclosure.

FIG. 4 is a diagram that illustrates an exemplary environment for object detection, in accordance with an embodiment of the disclosure. FIG. 4 is explained in conjunction with elements from FIGS. 1-3. With reference to FIG. 4, there is shown a block diagram 400. In the block diagram 400, there is shown an input image frame 402, an output image frame 404, and a second machine learning model 406 that may include an object detector 408 and an object classifier 410.

The circuitry 202 may apply the trained second machine learning model 406 on the input image frame 402 to detect and classify one or more objects in the input image frame 402. The second machine learning model 406 may be a classification based model (e.g. a convolutional neural network (CNN)). According to an embodiment, the object detector 408 may receive the input image frame 402. The object detector 408 may detect one or more objects in the input image frame 402, and may output a bounding box or an exact mask region for each detected object. The bounding box may include predicted coordinates of a rectangular box in the input image frame 402 within which the object may be present. Examples of the detected object may include, but are not limited to, a person, an animal, a vehicle, or any object of interest. The output of the object detector 408 may also include the set of first macroblocks of the input image frame corresponding to the detected objects in the input image frame.

According to an embodiment, the output of the object detector 408 may be fed to the object classifier 410. The object classifier 410 may be trained to extract CNN features for the detected object, and may output a class label for each detected object. The class label of the detected object may include, but is not limited to, a person, a cat, a dog, or a bike, a car, or other predefined class labels. The output of the second machine learning model 406 may include the output image frame 404 which may be associated with the bounding box or an exact mask region for each detected object, the class label for each detected object, and the set of first macroblocks corresponding to the detected objects. The second machine learning model 406 may thereby separate the foreground region corresponding to the detected objects from the background region corresponding to one or more regions other than the foreground region.

Figure 5:
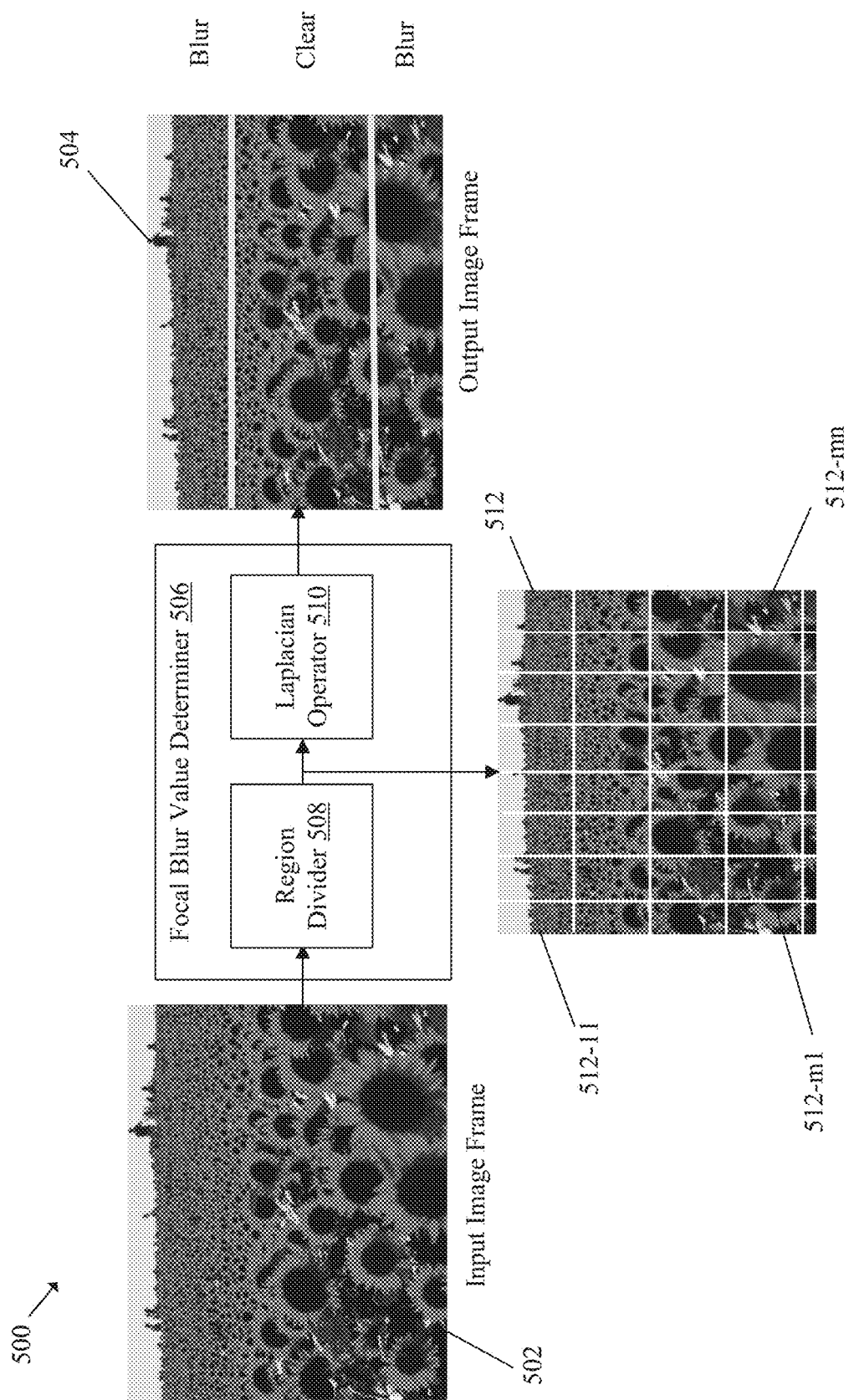
FIG. 5 is a diagram that illustrates an exemplary environment for focal blur value determination, in accordance with an embodiment of the disclosure.

FIG. 5 is a diagram that illustrates an exemplary environment for focal blur value determination, in accordance with an embodiment of the disclosure. FIG. 5 is explained in conjunction with elements from FIGS. 1-4. With reference to FIG. 5, there is shown a block diagram 500. In the block diagram 500, there is shown a focal blur value determiner 506 that may include a region divider 508 and a Laplacian operator 510.

According to an embodiment, the circuitry 202 may input an input image frame 502 to the region divider 508. The region divider 508 may be configured to divide the input image frame 502 into a plurality of macroblocks. The output of the region divider 508 may include an intermediate image frame 512 with the plurality of macroblocks 512-11 to 512-$mn$. In an example, m and n are integers that represent row and column numbers of the macroblocks in the input image frame 502.

According to an embodiment, the circuitry 202 may apply the Laplacian operator 510 or any other blur computing technique on the output of the region divider 508 to determine a focal blur value for each macroblock of the plurality of macroblocks 512-11 to 512-$mn$. In an example, the focal blur value is a Laplacian value. For a given tap size, the circuitry 202 may compute the Laplacian value of the input image frame 502. In an embodiment, the circuitry 202 may determine a focal blur value for each object in the input image frame 502. The focal blur value determiner 506 may classify each macroblock into one of a plurality of regions (e.g. blur region, clear region, etc.) based on the determined focal blur value associated with the corresponding macroblock. For example, the focal blur value determiner 506 may compare the focal blur for each macroblock with a threshold focal blur value. In a case where the focal blur value is greater than or equal to the threshold focal blur value, the focal blur value determiner 506 may classify the corresponding macroblock into a first region (e.g. a clear region) of the plurality of regions. In a case where the focal blur value is smaller than the threshold focal blur value, the focal blur value determiner 506 may classify the corresponding macroblock into a second region (e.g. a clear region) of the plurality of regions.

The circuitry 202 may determine the clear region as the foreground region (e.g. user interested region) of the output image frame 504 and may determine the blur region as the background region (e.g. lower user engaging region) of the output image frame 504. In an embodiment, the circuitry 202 may set the threshold focal blur value based on a detected scene in the input image frame 502. In another embodiment, the threshold focal blur value may be set by the trained second machine learning model 406 based on a training data set received during training phase of the second machine learning model 406.

In an embodiment, the circuitry 202 may determine a depth map associated with the input image frame 102. For example, the depth map is an image in which every pixel is associated with depth information. In an example, the depth information associated with a pixel in the input image frame 102 indicates a distance of a surface of an object corresponding to the pixel from a viewpoint. The circuitry 202 may be configured to detect the at least one foreground region and the at least one background region based on the range selected in the determined depth map.

In an example, the input image frame 102 includes a plurality of pixels. The circuitry 202 may determine, based on the determined depth map, a value of a distance associated with each pixel of the plurality of pixels. The circuitry 202 may classify, based on the value of distance, each pixel of the plurality of pixels as one of the at least one foreground region or the at least one background region. In an embodiment, the circuitry 202 may classify a pixel as the foreground region in a case where a corresponding value of the distance associated with the pixel is greater than or equal to a threshold distance. The circuitry 202 may classify a pixel as the background region in a case where a corresponding value of the distance associated with the pixel is out of range.

FIG. 6 is a diagram that illustrates foreground and backgrounds macroblocks in an image frame based on foreground-background separation, in accordance with an embodiment of the disclosure. FIG. 6 is explained in conjunction with elements from FIGS. 1-5. With reference to FIG. 6, there is shown an input image frame 102.

In an embodiment, the input image frame 102 may be processed by the second machine learning model 406 of FIG. 4 or the focal blur value determiner 506 of FIG. 5. Based on the processing, the input image frame 102 may be associated with a bounding box for each detected object (e.g. person, car, animal, etc.), the class label for each detected object, the set of first macroblocks 102a associated with the foreground region (e.g. region corresponding to the detected objects in FIG. 4 or region corresponding to the clear region in FIG. 5), and a set of second macroblocks 102b associated with the background region (e.g. region other than the foreground region).

Figure 7:
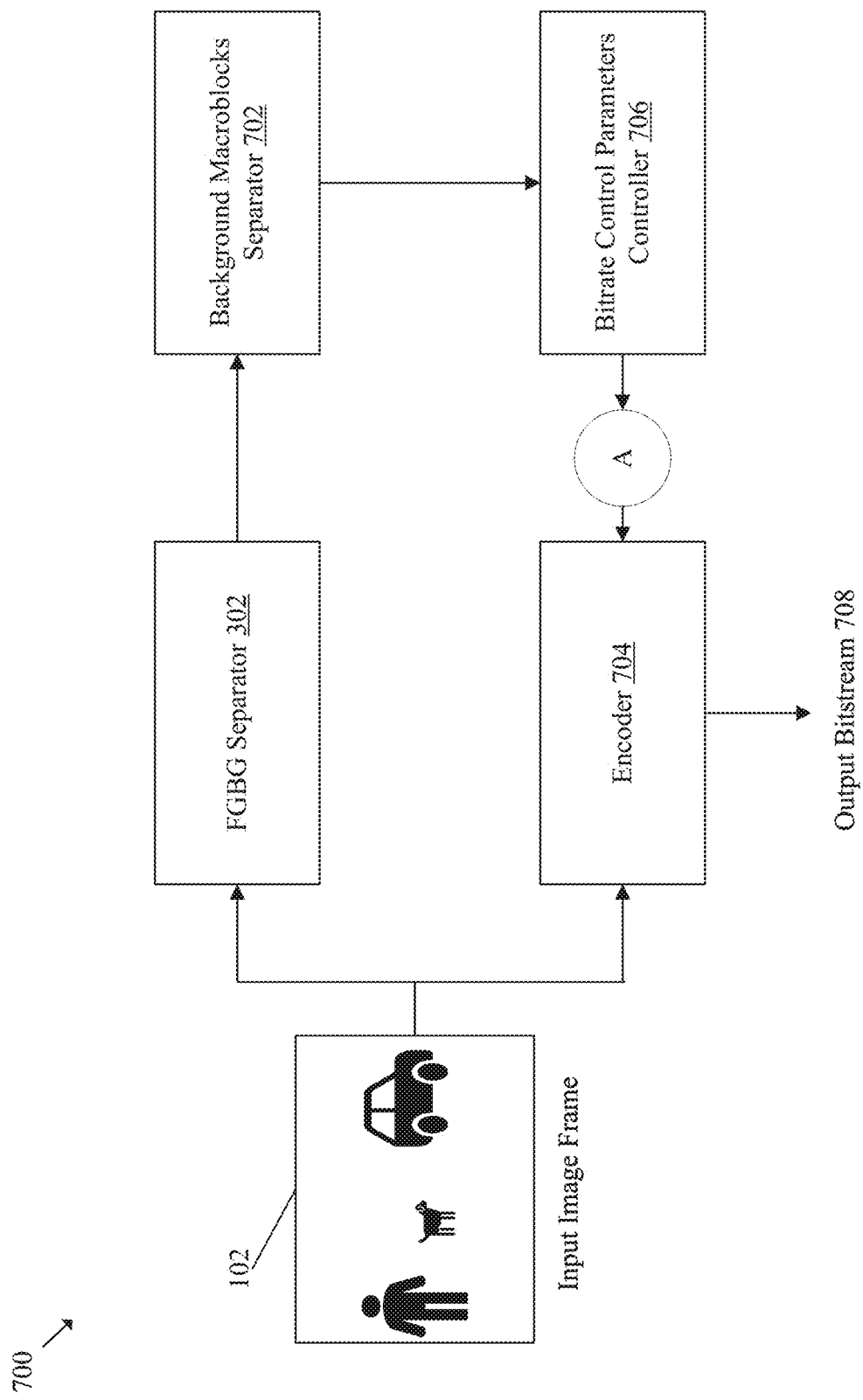
FIG. 7 is an exemplary block diagram for content-aware image encoding using a machine learning (ML) model, in accordance with an embodiment of the disclosure.

FIG. 7 is an exemplary block diagram for content-aware image encoding using a machine learning (ML) model, in accordance with an embodiment of the disclosure. FIG. 7 is explained in conjunction with elements from FIGS. 1-6. With reference to FIG. 7, there is shown a block diagram 700. In the block diagram 700, there are shown a foreground-background (FGBG) separator 302, a background macroblocks separator 702, an encoder 704, and a bitrate control parameters controller 706.

According to an embodiment, the circuitry 202 may input the input image frame 102 to the FGBG separator 302. The FGBG separator 302 may detect at least one foreground region and at least one background region in the input image frame 102. The FGBG separator 302 may output the detected background region and foreground region to the background macroblocks separator 702. In an example, the FGBG separator 302 may output the set of second macroblocks associated with the at least one background region or coordinates of the set of second macroblocks associated with the background region in the input image frame 102. Details of the FGBG separator 302 are further described, for example, in FIGS. 3-5.

Based on the output from the FGBG separator 302, the background macroblocks separator 702 may separate the set of second macroblocks corresponding to the background region of the input image frame 102. In an embodiment, the background macroblocks separator 702 may output information associated with the bit allocation of each pixel corresponding to the set of second macroblocks. In another embodiment, the background macroblocks separator 702 may output information that indicates a sum of bits allocated the set of second macroblocks.

In accordance with an embodiment, the output from the background macroblocks separator 702 is input to the bitrate control parameters controller 706. Based on the output from the background macroblocks separator 702, the bitrate control parameters controller 706 may determine one or more bit allocation control parameters for the set of second macroblocks. The determined bit allocation control parameters may include, but are not limited to, a bit-rate control parameter that corresponds to at least one of an initial quantization parameter (QP), a QP limiter, a group of pictures (GOP) bit allocation, a basic unit bit allocation, or an entropy coding parameter. In an example, the bit allocation control parameters may include a quantization parameter (QP) associated with the encoding of the input image frame 102.

In accordance with an embodiment, the bitrate control parameters controller 706 may update value of the bit allocation control parameters and output the updated value to the encoder 704. The bitrate control parameters controller 706 may update the value of the bit allocation control parameters iteratively until the image quality index (e.g. structural pattern) associated with the output image frame 108 matches the image quality index (e.g. structural pattern) associated with either the input image frame 102 or an intermediate image frame (e.g. third image frame) within a threshold range, where the intermediate image frame is generated from the input image frame 102 based on the previous updated value of the bit allocation control parameters.

In an embodiment, the bit allocation control parameter includes the quantization parameter. The bitrate control parameters controller 706 may determine, as the updated bit allocation control parameter, an updated quantization parameter which is between a minimum threshold quantization parameter and a default quantization parameter based on the application of the first trained machine learning model 106. In an example, the minimum threshold quantization parameter may be a quantization parameter value that maintains the second image quality index of the output image frame 108 to match the first image quality index of the input image frame 102. In an embodiment, the first trained machine learning model 106 may function as a QP predictor configured to determine the minimum threshold quantization parameter that satisfies the following conditions, namely, the generated bits of the background region are less than the available bandwidth, and the structural pattern of the generated image frame (e.g. output image frame 108) for the updated QP matches the structural pattern of the original input image frame 102 within a threshold range.

In another embodiment, the circuitry 202 may determine a network bandwidth associated with a video stream that includes the input image frame 102. The circuitry 202 may determine the minimum threshold quantization parameter based on the determined network bandwidth. In an embodiment, the encoder 704 may encode the input image frame 102 or the intermediate image frame with the updated value of the bit allocation control parameters to generate an output bitstream 708. The encoder 704 may generate a final encoded image using the updated value of the bit allocation control parameters. The details of the encoder 704 are further described, for example, in FIG. 8

Figure 8:
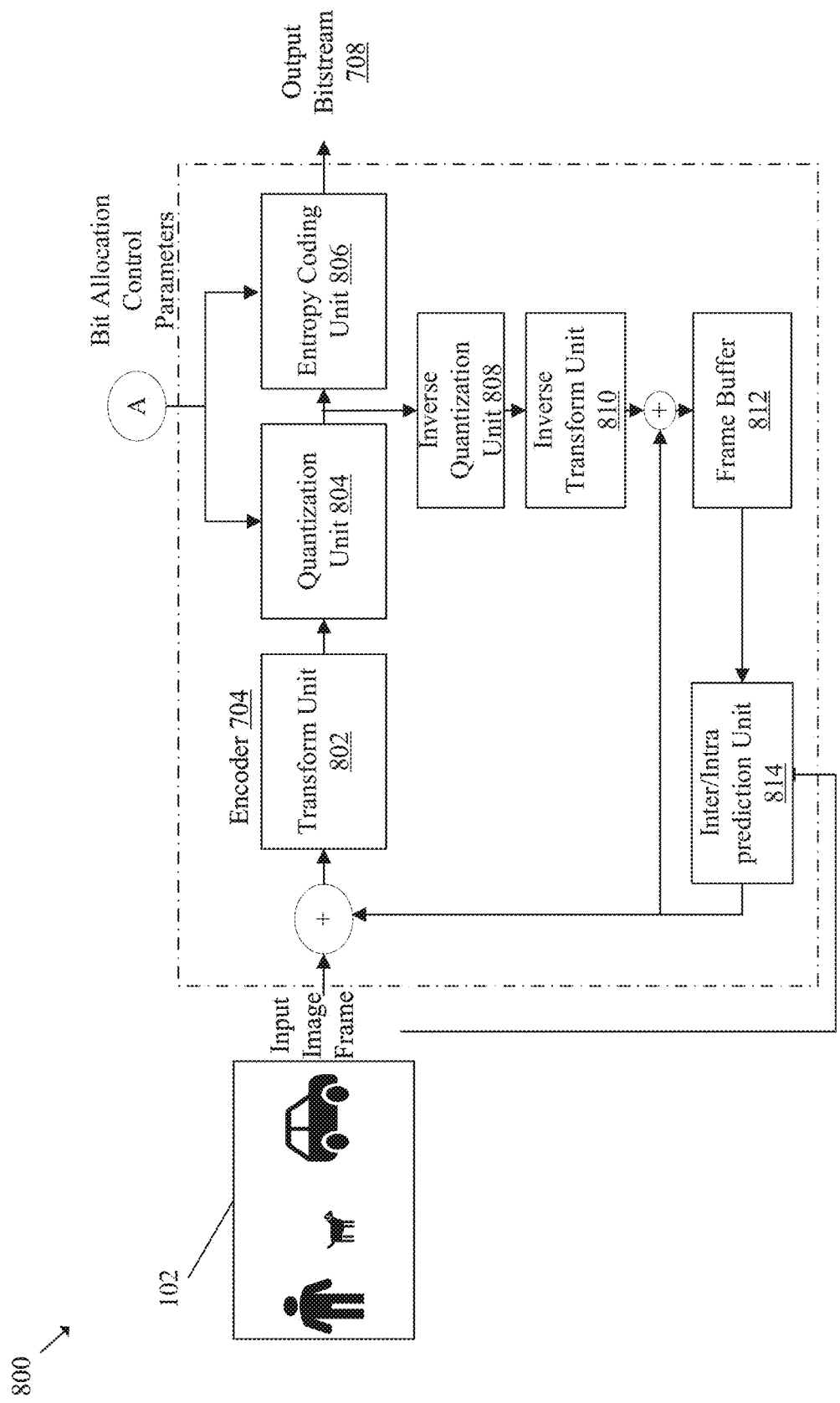
FIG. 8 is an exemplary block diagram of an encoder for content aware image encoding, in accordance with an embodiment of the disclosure.

FIG. 8 is an exemplary block diagram of an encoder for content aware image encoding, in accordance with an embodiment of the disclosure. FIG. 8 is explained in conjunction with elements from FIGS. 1-7. With reference to FIG. 8, there is shown a block diagram 800. In the block diagram 800, there is shown the encoder 704 that includes a transform unit 802, a quantization unit 804, an entropy coding unit 806, an inverse quantization unit 808, an inverse transform unit 810, a frame buffer 812, and a inter/intra prediction unit 814.

In accordance with an embodiment, the transform unit 802 may transform the input image frame 102 from a spatial domain to a spectral domain using a transform function. For example, the transform function may include, but is not limited to, discrete cosine transform (DCT), wavelet transform (WT), Fourier transform (FT), or a variant thereof. In an embodiment, the quantization unit 804 may receive the updated value of the one or more bit allocation control parameters from the bitrate control parameter controller 706 of FIG. 7. In another embodiment, the entropy coding unit 806 may receive the updated value of the one or more bit allocation control parameters from the bitrate control parameter controller 706 of FIG. 7. The quantization unit 804 may quantize the transformed input image frame 102 based on the updated value of the one or more bit allocation control parameters (e.g. the updated QP value). The quantized value from the quantization unit 804 is output to the entropy encoding unit 806 which may encode the quantized values to generate the output bitstream 708. In a reconstruction path of the encoder 704, the quantized data from the quantization unit 804 may be decoded to reconstruct a frame. The quantized data may be inverse quantized by the inverse quantization unit 808 and inverse transformed by the inverse transform unit 810. The inverse quantization unit 808, the inverse transform unit 810, the frame buffer 812, and the inter/intra prediction unit 814 form the reconstruction path of the encoder 704 for intra/inter prediction.

Figure 9:
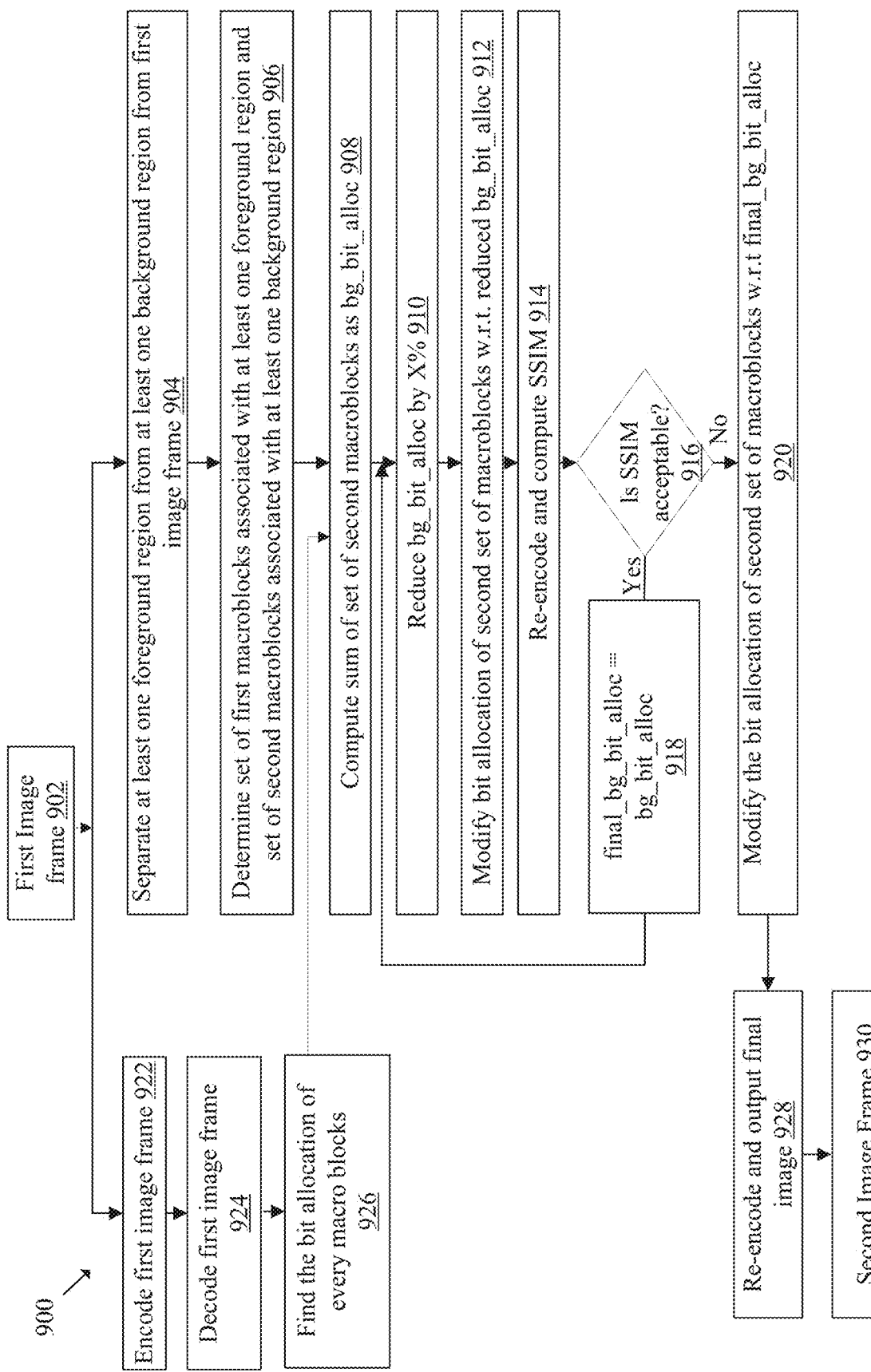
FIG. 9 is an exemplary flow diagram that illustrates content-aware image encoding, in accordance with an embodiment of the disclosure.

FIG. 9 is an exemplary flow diagram that illustrates content-aware image encoding, in accordance with an embodiment of the disclosure. FIG. 9 is described in conjunction with elements from FIGS. 1-8. With reference to FIG. 9, there is shown a flowchart 900. The exemplary method illustrated in the flowchart 900 may start at 904 and may be performed by any suitable system, apparatus, or device, such as, the electronic device 104 of FIG. 1 or the circuitry 202 of FIG. 2. Although illustrated with discrete blocks, the steps and operations associated with one or more operations of the flowchart 900 may be divided into additional blocks, combined into fewer blocks, or eliminated, depending on the particular implementation.

At 904, the at least one foreground region may be separated from the at least one background region of the first image frame 902. The circuitry 202 may be configured to separate the at least one foreground region from the at least one background region of the first image frame 902. In an embodiment, the circuitry 202 may apply the second machine learning model 406 on the first image frame 902 to separate the at least one foreground region and the at least one background region in the first image frame 902. In an embodiment, the circuitry 202 may detect an object of interest (e.g. a human) in the first image frame 902. The circuitry 202 may determine a region in the first image frame 902 surrounding the detected object of interest as the foreground region. The circuitry 202 may determine a region in the input image frame 102 other than the foreground region as the background region. In an example, the circuitry 202 may determine more than one foreground region and more than one background region in the first image frame 902. In another example, the circuitry 202 may detect a moving object in a set of image frames including the first image frame 902. The circuitry 202 may determine the foreground region based on a movement of the moving object.

In another example, the circuitry 202 may detect the object of interest based on the use case scenario. For example, in a surveillance system, the object of interest may be a moving object. In a case where the first image frame 902 includes moving person and a moving animal, the circuitry 202 may determine the person as the object of interest, but may not determine the animal as the object of interest. The circuitry 202 may determine the region surrounding the person as the foreground region and the region surrounding the animal as the background region.

At 906, a set of first macroblocks associated with the at least one foreground region and a set of second macroblocks associated with the at least one background region may be determined. The circuitry 202 may determine the set of first macroblocks associated with the at least one foreground region and the set of second macroblocks associated with the at least one background region, as shown in FIG. 6.

At 922, the first image frame 902 may be encoded. The circuitry 202 may encode the first image frame 902 using default QP values.

At 924, the encoded first image frame 902 may be decoded. The circuitry 202 may decode the encoded first image frame 902.

At 926, a bit allocation of each macroblock of the first image frame 902. may be determined. For example, the circuitry may determine a number of bits allocated to each macroblock of the plurality of macroblocks of the first image frame 902.

At 908, a sum of the set of second macroblocks corresponding to the background region may be computed as a value "bg_bit_alloc". For example, the circuitry 202 may compute a sum of bits allocated to the set of second macroblocks corresponding to the background as the value "bg_bit_alloc".

At 910, the value "bg_bit_alloc" may be reduced by X %. For example, the circuitry 202 may reduce the value "bg_bit_alloc" by a predetermined percentage (e.g. 5%). For example, the predetermined percentage may be X % of the sum of the bits allocated to the set of second macroblocks. The value of X may be, but not limited to, 5 or multiples thereof.

At 912, a bit allocation of the set of second macroblocks (e.g. background macroblocks) may be modified with respect to the reduced value "bg_bit_alloc". For example, the circuitry 202 may modify the bit allocation for the set of second macroblocks (e.g. background macroblocks) based on the reduced value "bg_bit_alloc". In an embodiment, the circuitry 202 may evenly reduce the bit allocation across the set of second macroblocks. In an embodiment, the bit allocation of the set of second macroblocks may be modified by modification of the QP value.

At 914, the first image frame 902 may be re-encoded, and the structural similarity index metric (SSIM) may be computed. For example, the circuitry 202 may re-encode the first image frame 902 to obtain an intermediate image frame with the modified bit allocation for the set of second macroblocks, and may compute the SSIM for the intermediate image frame. In an example, the SSIM may indicate the image quality index. The circuitry 202 may calculate a first SSIM for the first image frame 902 and a second SSIM for the intermediate image frame encoded with the modified bit allocation for the set of second macroblocks.

In an example, the SSIM index is a function for predicting perceived quality of digital television and cinematic pictures for all kind of videos and images. The SSIM index is based on computation of three terms, namely the luminance term, the contrast term, and the structural term. The SSIM index is a multiplicative combination of the three terms as shown in relations (1), (2), (3), and (4).

$$SSIM(x, y) = [l(x, y)]^\alpha \cdot [c(x, y)]^\beta \cdot [s(x, y)]^\gamma \quad (1)$$

$$l(x, y) = \frac{2\mu_x\mu_y + C_1}{\mu_x^2 + \mu_x^2 + C_1} \quad (2)$$

$$c(x, y) = \frac{2\sigma_X\sigma_y + C_2}{\sigma_x^2 + \sigma_x^2 + C_2} \quad (3)$$

$$c(x, y) = \frac{\sigma_{xy} + C_3}{\sigma_x\sigma_y + C_3}, \quad (4)$$

where, $\mu_x$ and $\mu_y$ are local means for an image I (x,y), $\sigma_y$ and $\sigma_y$ are standard deviations for the image I (x,y), and $\sigma_{xy}$ is cross covariance for the image I (x,y).

At 916, a determination may be made whether the computed SSIM is acceptable. The circuitry 202 may determine whether the first SSIM (e.g. the structural pattern of the first image frame 902) matches with the second SSIM (e.g. the structural pattern of the intermediate image frame) within a threshold range. In an example, the difference between the first SSIM and the second SSIM may be required to be less than a threshold difference for the image quality of the intermediate image frame encoded with the modified bit allocation to match the image quality of the first image frame 902.

At 918, the reduced value "bg_bit_alloc" may be set as "final_bg_bit_alloc". The circuitry may set the reduced value "bg_bit_alloc" corresponding to the set of second macroblocks as the final bit allocation "final_bg_bit_alloc". In a case where the SSIM acceptable, the circuitry 202 may repeat the steps from 910 through 916 to further reduce the value of bg_bit_alloc by X %, modify the bit allocation for the set of second macroblocks, re-encode the first image frame 902 with the modified bit allocation, and calculate the second SSIM for the intermediate image frame encoded with the modified bit allocation. The circuitry 202 may again determine whether the second SSIM matches with the first SSIM within the threshold range. In this manner, the circuitry 202 may iteratively execute the set of operations 910-918 as long as the second SSIM matches with the SSIM of the original frame (i.e. the first image frame 902 encoded with default QP values) within the threshold range. In a case where the second SSIM index does not match with the first SSIM index, the control may transfer to 920.

At 920, the bit allocation of the set of second macroblocks may be modified with respect to the final value "final_bg_bit_alloc". For example, the circuitry 202 may modify the bit allocation of the set of second macroblocks based on the final value "final_bg_bit_alloc" set in the previous iteration, in a case where SSIM of the intermediate image frame in the current iteration is not acceptable.

At 928, the first image frame 902 may be re-encoded and a final image may be output. For example, the circuitry 202 may re-encode the first image frame 902 using the modified bit allocation for the set of second macroblocks, and may output a final compressed image as the output image frame (e.g. second image frame 930). The size of the second image frame 930 may be less than the size of the original image frame (e.g. the first image frame 902). The details of the size gain in compression are further described, for example, in FIGS. 15 and 16. It may be noted that the set of first macroblocks corresponding to the foreground may be encoded with default QP values to retain the high image quality of the foreground region, while the image quality of the background region(s) may be reduced until the structural pattern matches the original image frame within an acceptable threshold range. Control may then pass to end.

Although the flowchart 900 is illustrated as discrete operations, such as 904-928. However, in certain embodiments, such discrete operations may be further divided into additional operations, combined into fewer operations, or eliminated, depending on the particular implementation without detracting from the essence of the disclosed embodiments.

Figure 10:
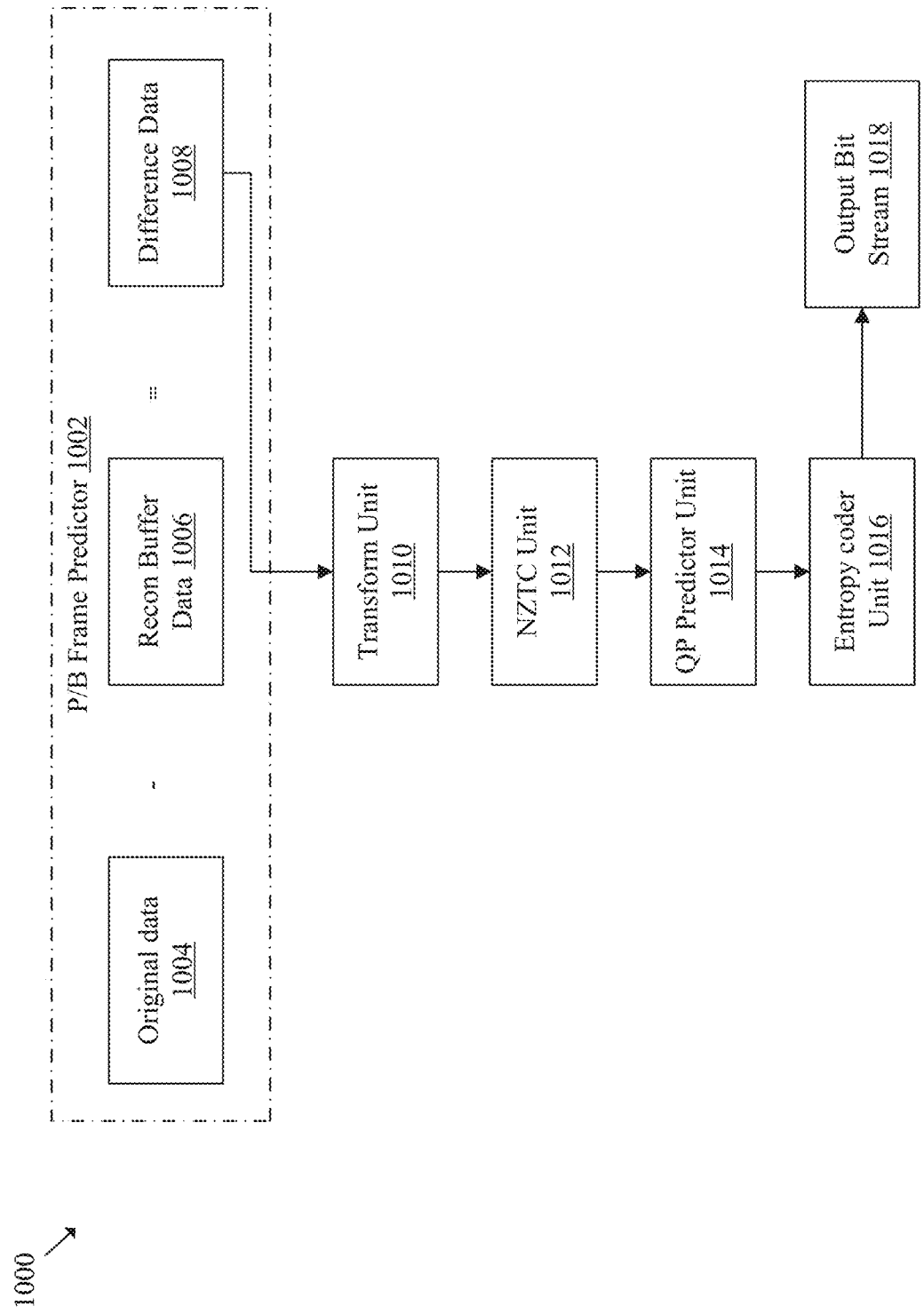
FIG. 10 is an exemplary block diagram that illustrates processing for background region in P and B image frames, in accordance with an embodiment of the disclosure.

FIG. 10 is an exemplary block diagram that illustrates processing for background region in P and B image frames, in accordance with an embodiment of the disclosure. FIG. 10 is explained in conjunction with elements from FIGS. 1-9. With reference to FIG. 10, there is shown a block diagram 1000. In the block diagram 1000, there is shown a P/B frame predictor 1002, a transform unit 1010, a non-zero transform coefficient (NZTC) unit 1012, a quantization parameter (QP) predictor 1014, and an entropy coder unit 1016.

In accordance with an embodiment, the circuitry 202 may retrieve a video that includes a set of image frames. In an example, the set of image frames may include three types of frames, namely, an I-frame, a P-frame, and a B-frame. The I-frame is an intra-coded picture which is encoded without information from other frames. The P-frame is a frame that uses prediction from a single preceding reference frame. The B-frame is a frame that uses prediction from one preceding frame and one succeeding frame. In an embodiment, the circuitry 202 may encode the I-frame based on the modified bit allocation for the background macroblocks as described in FIGS. 7-9. The circuitry 202 may further employ the P/B frame predictor 1002, the transform unit 1010, the NZTC unit 1012, the QP predictor 1014, and the entropy coder unit 1016 to encode the P-frame and the B-frame in the set of image frames.

In an embodiment, the P/B frame predictor 1002 may obtain difference data 1008 based on a difference between original data 1004 and reconstructed buffer data 1006. The transform unit 1010 may apply, for example, DCT to the difference data 1008 to generate a set of transform coefficients. The NZTC unit 1012 may select non-zero transform coefficients from the set of transform coefficients. The QP predictor 1014 may use the non-zero transform coefficients to predict a value of the bit allocation control parameter for the original data 1004. In an embodiment, the QP predictor 1014 may apply the trained first machine learning model 106 to predict the value of the bit allocation control parameter. The entropy coder unit 1016 may encode the difference data 1008 based on the predicted value of the bit allocation control parameter to generate an output bit stream 1018.

Figure 11A:
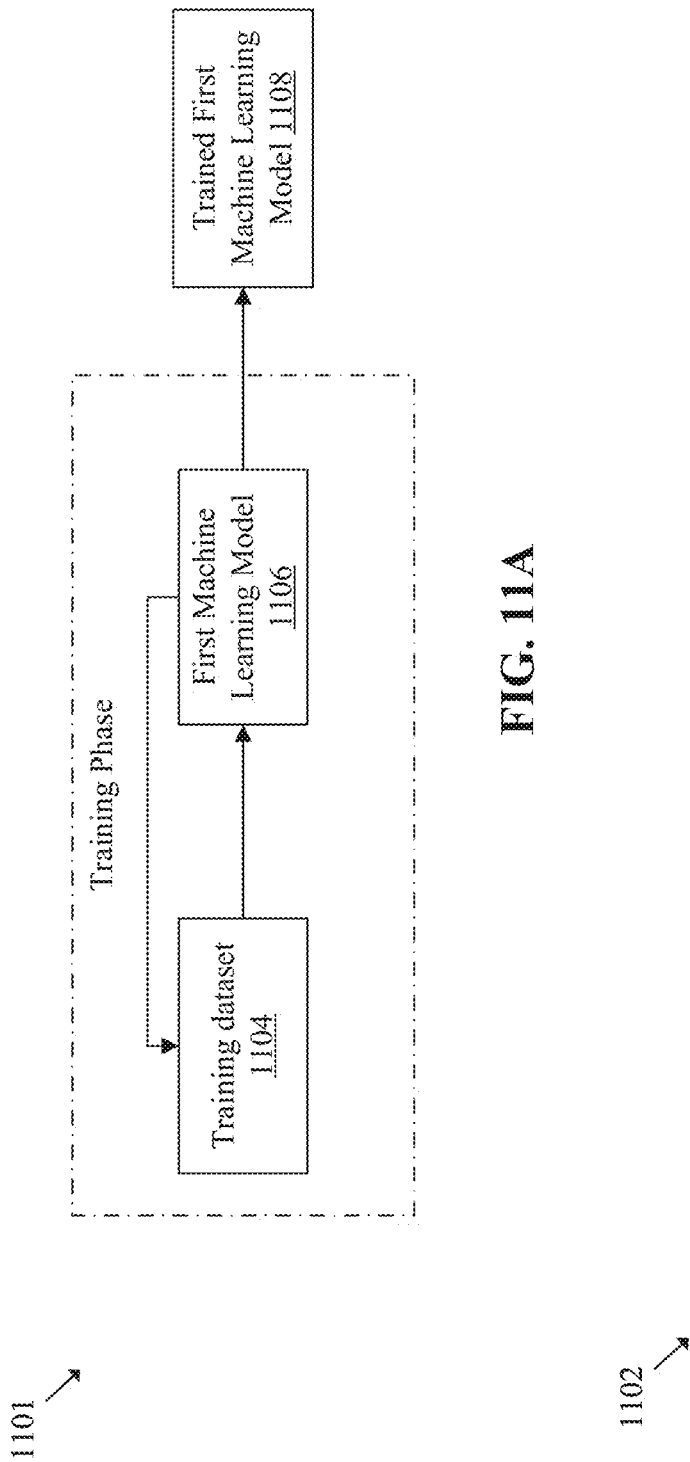
FIG. 11A is a diagram that illustrates training of a machine learning (ML) model for content-aware encoding, in accordance with an embodiment of the disclosure.

FIG. 11A is a diagram that illustrates training of a machine learning (ML) model for content-aware encoding, in accordance with an embodiment of the disclosure. FIG. 11A is described in conjunction with elements from FIGS. 1-10. With reference to FIG. 11A, there is shown a block diagram 1101. In the block diagram 1101, there is shown a training dataset 1104 as input, a first machine learning model 1106, and a trained first machine learning model 1108 as output. The trained first machine learning model 1108 may be similar in functionality to the first machine learning model 106 shown in FIG. 1.

In an embodiment, the circuitry 202 may be configured to train the first machine learning model 1106 on the training dataset 1104. The training dataset 1104 may include a default quantization parameter associated with a set of second macroblocks (e.g. background macroblocks), a modified quantization parameter associated with the determined set of second macroblocks (e.g. background macroblocks), a foreground occupancy percentage in a set of image frames, a background occupancy percentage in the set of image frames, a quantization parameter divisor, a bit consumption associated with the determined set of second macroblocks, and an available network bandwidth for transmission of the first image frame (e.g. input image frame 102), and so on. The circuitry 202 may train the first machine learning model 1106 to generate the trained first machine learning model 1108.

Table 1 illustrates the training dataset 1104 provided as input to the first machine learning model 1106 during the training phase of the first machine learning model 1106.

TABLE 1

Training dataset for first machine learning model 1106

| S No. | Input frame | Foreground occupancy % | Background occupancy % | quantization parameter divisor | Bit generated | Bandwidth |
|---|---|---|---|---|---|---|
| 1 | Sample 1 | 50 | 50 | 10 | Bitval 1 | Bw1 |
| 2 | Sample 1 | 50 | 50 | 20 | Bitval 2 | Bw2 |
| 3 | Sample 2 | 30 | 70 | 10 | Bitval 3 | Bw3 |
| ... | ... | ... | ... | ... | ... | ... |
| X | Sample X | FGocc X | BGocc X | QP-red X | Bitval X | Bw X |

Figure 11B:
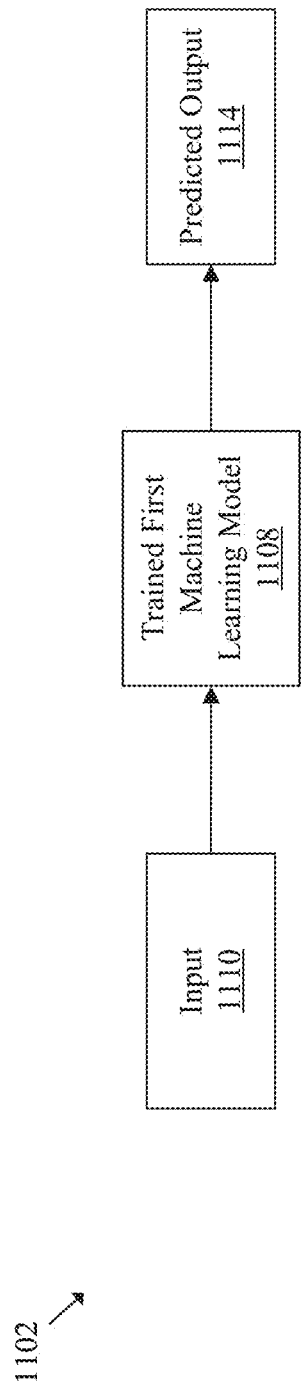
FIG. 11B is a diagram that illustrates an exemplary environment for a trained ML model for content-aware encoding, in accordance with an embodiment of the disclosure.

FIG. 11B is a diagram that illustrates an exemplary environment for a trained ML model for content-aware encoding. FIG. 11A is described in conjunction with elements from FIGS. 1-10 and 11A. With reference to FIG. 11B, there is shown a block diagram 1102. In the block diagram 1102, there is shown a trained first machine learning model 1108. In an embodiment, the circuitry 202 may apply the trained first machine learning model 1108 on an input 1110 to generate a predicted output 1114 (e.g. predicted or modified QP) for the bit allocation for background macroblocks of the input image frame 102. Examples of the input 1110 may include the default QP, foreground occupancy percentage of the input image frame 102, background occupancy of the input image frame 102, available bandwidth, and so on. In an embodiment, the trained first machine learning model 1108 may be configured to predict the appropriate QP between a minimum threshold QP and a default QP for the bit allocation. The circuitry 202 may be configured to perform the bit allocation for the background macroblocks based on the predicted QP. In an embodiment, the minimum threshold QP may satisfy the following conditions, namely, the generated bits of the encoded image frame are less than the available bandwidth, and the structural pattern of the generated frame for the modified QP matches the structural pattern of the original frame within the threshold range.

Figure 12:
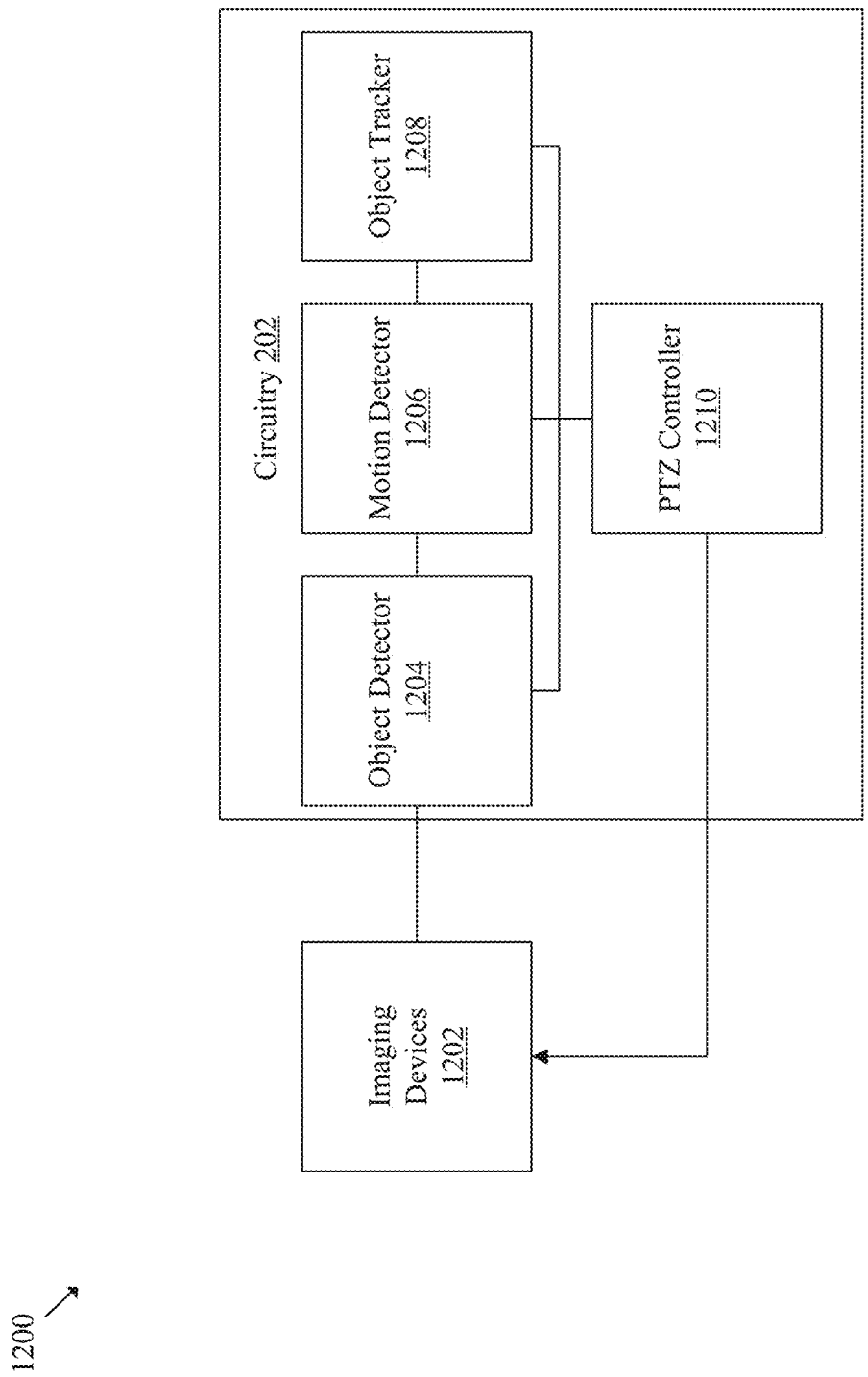
FIG. 12 is a diagram of an exemplary environment that illustrates a surveillance application using content-aware image encoding, in accordance with an embodiment of the disclosure.

FIG. 12 is a diagram of an exemplary environment that illustrates a surveillance application using content-aware image encoding, in accordance with an embodiment of the disclosure. FIG. 12 is explained in conjunction with elements from FIGS. 1-10, 11A, and 11B. With reference to FIG. 12, there is shown an exemplary scenario 1200. In the exemplary scenario 1200, there are shown a set of imaging devices 1202, and the circuitry 202. The circuitry 202 may further include an object detector 1204, a motion detector 1206, an object tracker 1208, and a pan tilt zoom (PTZ) controller 1210.

In the exemplary scenario 1200, there is shown a process flow of a smart surveillance system that utilizes distributed camera networks. The set of imaging devices (e.g. surveillance cameras) may generate a huge amount of video data which needs to be processed and appropriate actions or pan-tilt-zoom (PTZ) parameters needs to be fed back to the surveillance cameras for PTZ operations. The set of imaging devices 1202 may connected by routers to the communication network 110 (such as the Internet).

In an embodiment, the circuitry may receive the video data (e.g. set of image frames) from the set of imaging devices 1202. The circuitry 202 may process the video data from the set of imaging devices 1202. Based on a result of the processing of the video data, the PTZ controller 1210 may control the PTZ operations of the set of imaging devices 1202. In an embodiment, the processing of the video data may include application of the object detector 1204, the motion detector 1206, and the object tracker 1208 on the video data. The object detector 1204 may detect one or more objects (e.g. a human) in the set of image frames of the video data. The motion detector 1206 may detect a motion of the detected one or more objects across the set of image frames in the video data. In an embodiment, the motion detector 1206 may determine a set of objects which are in motion from the detected one or more objects.

The object tracker 1208 may track the motion of the determined set of objects across the set of image frames of the video data. The object detector 1204 and the object tracker 1208 may detect and track one or more objects based on user selection or automatically based on a priority or preference of the surveillance system. The circuitry 202 may then determine at least one region in each image frame of the video data as the foreground region based on an output of the at least one of the object detector 1204, the motion detector 1206, and the object tracker 1208. The circuitry 202 may determine at least one region other than the foreground region in each image frame of the video data as the background region. The circuitry may update the bit allocation control parameter associated with the macroblocks of the background region based on the application of the first trained machine learning model 106, and encode each image frame of the video data based on the updated bit allocation control parameter to generate a compressed video. The first image quality index (e.g. structural pattern) associated with each image frame of the video data may match a second image quality index (e.g. structural pattern) associated with a corresponding encoded image frame of the compressed video.

The circuitry 202 may thereby generate an output compressed video having a reduced size compared to the original video from the surveillance cameras while retaining the default image quality (or default bit allocation) of the foreground regions corresponding to the user selected or automatically selected objects. The circuitry 202 may thereby save the bandwidth usage required to feed the video data from multiple surveillance cameras through processing blocks of the surveillance system, without compromising the image quality of regions of interest which are the target of the surveillance system. In places where there may be hundreds of surveillance cameras placed across multiple locations for monitoring, network usage may be equal to number of cameras that are streaming the video data concurrently. Based on the compression of the video, the network usage may be brought down significantly by reducing the bit occupancy of the background region(s) only. In an embodiment, the process flow shown in exemplary scenario 1200 may be similarly employed for IoT applications to reduce the size of IoT sensor data streams, while retaining default image quality for regions of interest to the user.

In another exemplary scenario of a memory device (e.g. personal storage or camera storage), a set of files may be stored such that the memory device may have reached its memory capacity. In such cases, new files cannot be accommodated without deleting existing files when the memory device is full or reaches "memory full" warning stage. In an example, the memory device may be a part of the user device 114. In accordance with an embodiment, the circuitry 202 may be configured to select a file, from the set of files, in the memory device based on user input. In another embodiment, the circuitry 202 may automatically select the file from the set of files based on a time of creation of the file, a time of modification of the file, one of a time a frequency of access of the file, or any other recommended criteria. For example, the circuitry 202 may select the least accessed file among the set of files. In an example, the input image frame 102 may correspond to the selected file, and the selected file may include an image or a video. The circuitry 202 may then compress the selected file by encoding the selected file (e.g. input image frame 102) based on the modified bit allocation for the background regions, as described in FIGS. 7-9. As a result of the compression of existing files in the memory device, the available storage space in the memory device may increase, and a new file may be stored in the memory device without deleting any of the existing files when the memory device is full or reaches "memory full" warning stage.

Figure 13:
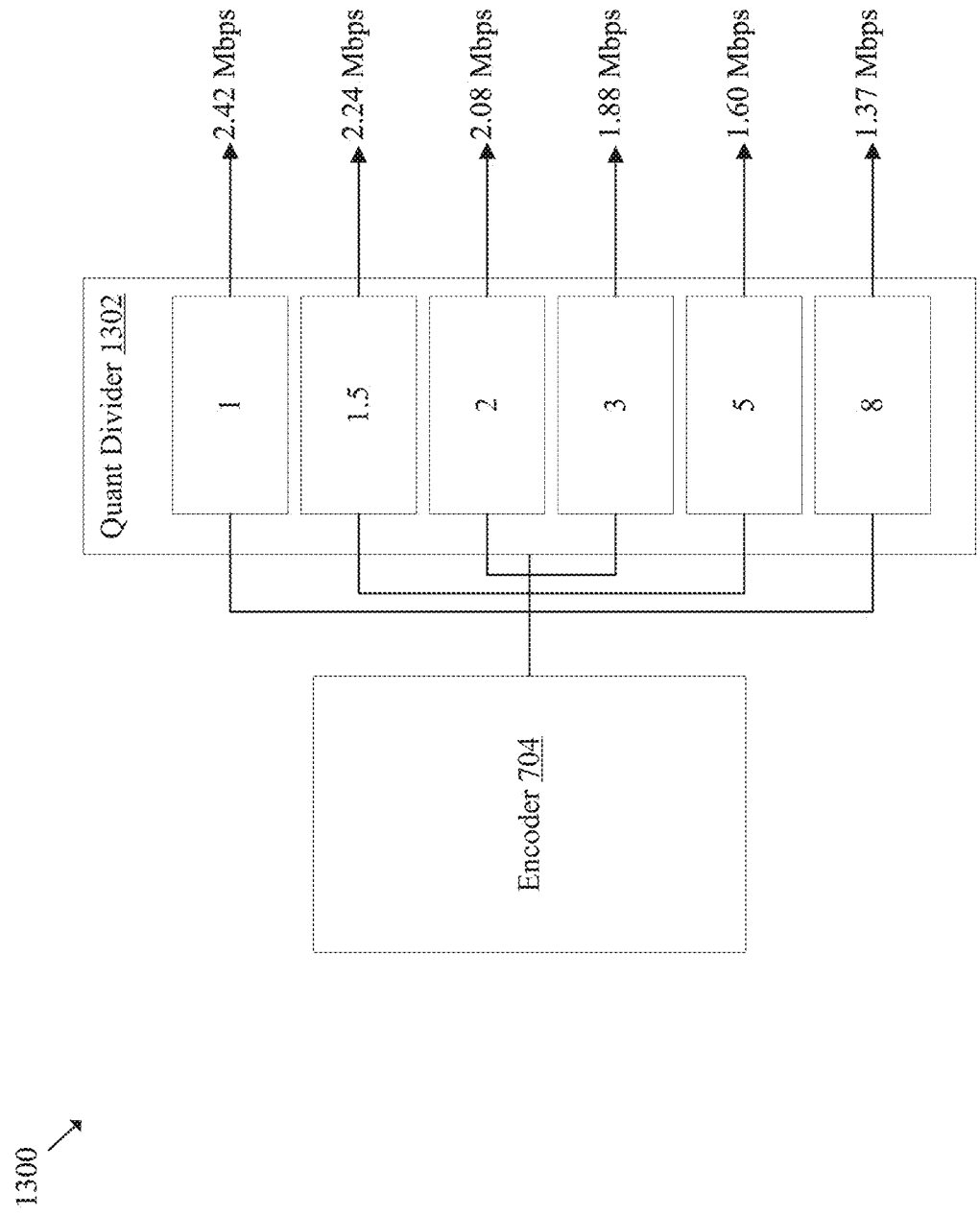
FIG. 13 is a diagram of an exemplary environment that illustrates a streaming application for a content delivery network (CDN) using content-aware image encoding, in accordance with an embodiment of the disclosure.

FIG. 13 is a diagram of an exemplary environment that illustrates a streaming application for a content delivery network (CDN) using content-aware image encoding, in accordance with an embodiment of the disclosure. FIG. 13 is explained in conjunction with elements from FIGS. 1-10, 11A, 11B, and 12. With reference to FIG. 13, there is shown an exemplary scenario 1200 for the CDN application. In the exemplary scenario 1200, there are shown the encoder 704 and a quant divider 1302.

In an embodiment, the encoder 704 may generate a plurality of output bit streams with different bitrates based on different QP values. Each output bitstream of the plurality of output bitstreams may be generated based on a corresponding value of the quant divider 1302. In an example, the value of the quant divider 1302 may correspond to the quantization parameter, and may indicate the magnitude of reduction of the bit allocation of the background macroblocks. For example, a value of the quant divider of 2 may reduce the bit allocation of the background macroblocks more than the bit allocation corresponding to a value of the quant divider of 1.5. In an example, the bitrates of the plurality of output bit streams corresponding to different values of the quant divider 1302 may be 2.42 Mbps, 2.24 Mbps, 2.08 Mbps, 1.88 Mbps, 1.60 Mbps, and 1.37 Mbps for the values of quant divider 1302 as 1, 1.5, 2, 3, 5, and 8, respectively.

In an embodiment, the quant divider 1302 may receive a request from an external receiving device (e.g. user device 114) to generate an output bitstream with a specific bitrate that meets the available network bandwidth requirement of the external receiving device. In another embodiment, the circuitry 202 may detect the available network bandwidth at the external receiving device and may select the specific bitrate that is compatible with the available network bandwidth at the external receiving device. The circuitry 202 may generate and transmit the output bit stream based on the corresponding value of the quant divider 1302.

Figure 14:
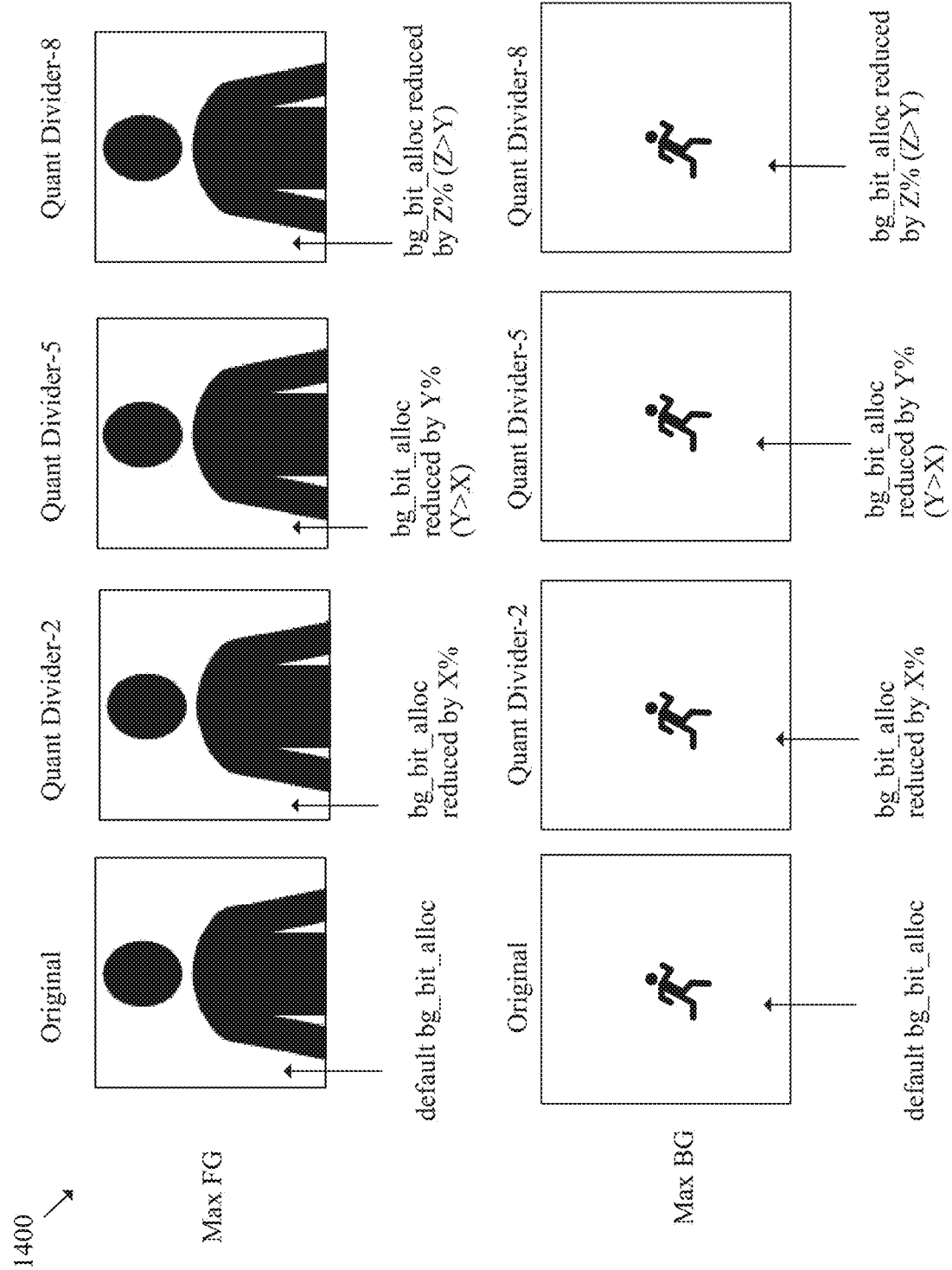
FIG. 14 is a diagram that illustrates results of content-aware image encoding for a content delivery network (CDN), in accordance with an embodiment of the disclosure.

FIG. 14 is a diagram that illustrates results of content-aware image encoding for a content delivery network (CDN), in accordance with an embodiment of the disclosure. FIG. 14 is explained in conjunction with elements from FIGS. 1-10, 11A, 11B, 12, and 13. With reference to FIG. 14, there is shown an exemplary scenario 1400. In the exemplary scenario 1400, there is shown a set of screenshots of an encoded image frame having maximum foreground occupancy (Max FG shown in upper row) and an encoded image frame having maximum background occupancy (Max BG shown in lower row). It may be noted that FIG. 14 shows a single object in each image frame for the sake of simplicity, and there may be several other objects in each image frame that may be classified as either the background region or the foreground region based on object classification types.

As shown in FIG. 14, each image frame may be encoded with a different value of the quant divider 1302 of FIG. 13. For example, the left-most image is least compressed, and the right-most image is the most compressed. In other words, the bit allocation of the background regions is unmodified in the left-most image, and the bit allocation of the background regions is modified (e.g. reduced) 8 times in the right-most image with respect to the left-most image. In all the images, the foreground regions are encoded with default QP values (i.e. default bit allocation) and retain the original image quality. In all the images except the left-most image, the background regions are reduced in image quality (e.g. resolution, bit rate, etc.) as long as the structural pattern of the background regions in the compressed image matches the structural pattern of the original uncompressed image within the threshold range in terms of perceived image quality. For example, the background region of the left-most image frame may be encoded with the default background bit allocation (default bg_bit_alloc), the background region of the second image frame from the left may be encoded with a background bit allocation (bg_bit_alloc) reduced by X % (e.g. 5%) for quant divider-2, the background region of the third image frame from the left may be encoded with a background bit allocation (bg_bit_alloc) reduced by Y % (where Y>X) for quant divider-5, and the background region of the fourth image frame from the left may be encoded with a background bit allocation (bg_bit_alloc) reduced by Z % (where Z>Y) for quant divider-8.

Figure 15:
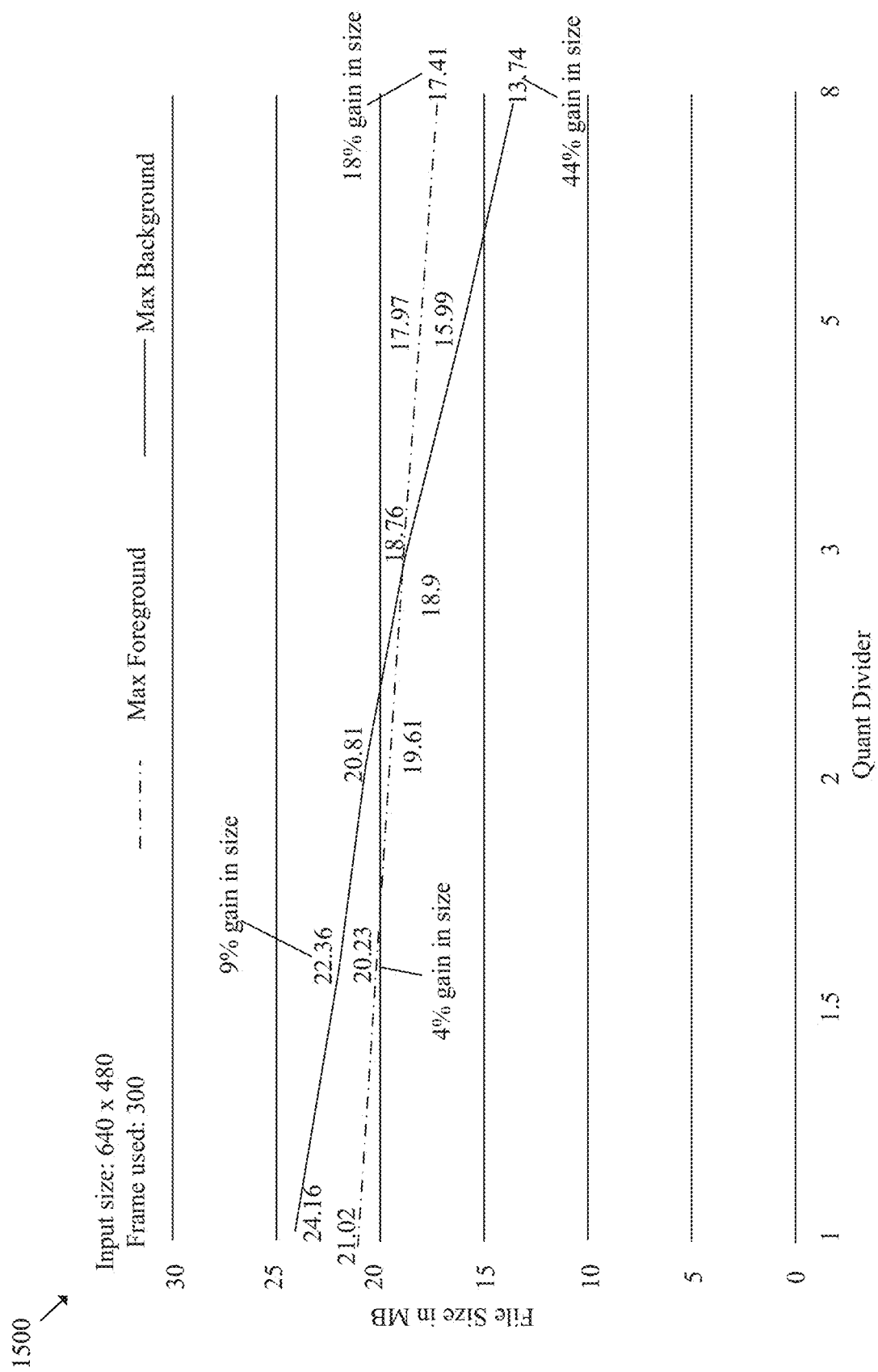
FIG. 15 is a diagram that illustrates a graph showing results of content-aware image encoding, in accordance with an embodiment of the disclosure.

FIG. 15 is a diagram that illustrates a graph showing results of content-aware image encoding, in accordance with an embodiment of the disclosure. FIG. 15 is explained in conjunction with elements from FIGS. 1-10, 11A, 11B, 13, and 14. With reference to FIG. 15, there is shown a graph 1500 that illustrates a size gain due to encoding of an image frame according to the coding technique described in FIGS. 7-9. The resulting sizes are shown using a dotted line for the image frame having maximum foreground occupancy (e.g. 62% foreground, 38% background), and using a solid line for the image frame having maximum background occupancy (e.g. 15% foreground, 85% background). The X-axis of the graph 1500 represents different values of the quant divider 1302 of FIG. 13, and the Y-axis of the graph 1500 represents the size of the image frame in MBs.

As shown in FIG. 15, for the value of 1.5 of the quant divider 1302, a size gain of 9% is achieved for the image frame having maximum background occupancy based on the compression according to the coding technique described in FIGS. 7-9. For the value of 1.5 of the quant divider 1302, a size gain of 4% is achieved for the image frame having maximum foreground occupancy. For the value of 8 of the quant divider 1302, a size gain of 44% is achieved for the image frame having maximum background occupancy. For the value of 8 of the quant divider 1302, a size gain of 18% is achieved for the image frame having maximum foreground occupancy. The gain in size may be for a single frame or may be the overall gain for a plurality of image frames (e.g. 300 frames). It may be noted the size gain achieved for the image frame having maximum background occupancy is greater compared to the size gain achieved for the image frame having maximum foreground occupancy, owing to the higher percentage of the background region than the foreground region in the image frame having maximum background occupancy.

Figure 16:
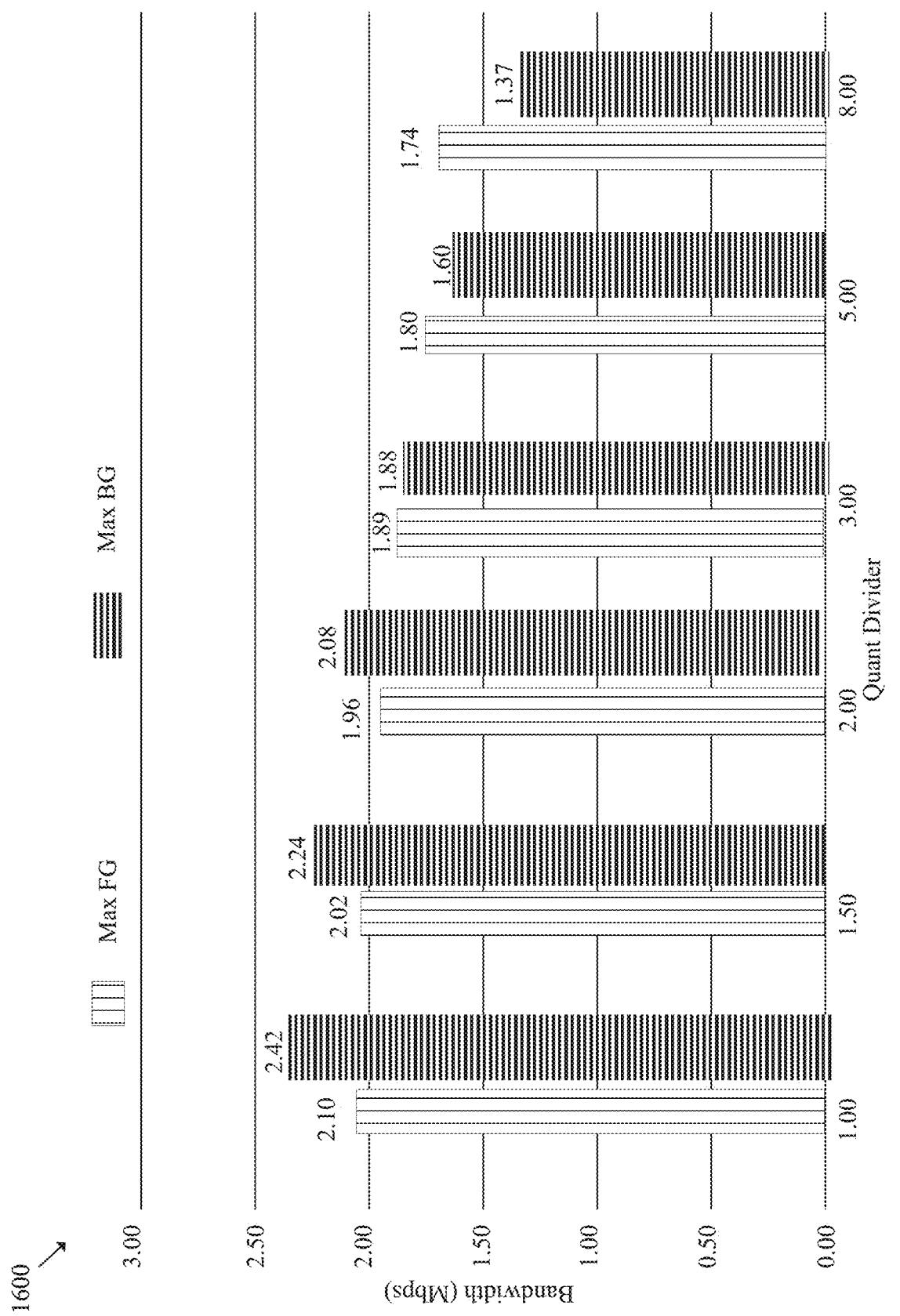
FIG. 16 is a diagram that illustrates a graph showing results of content-aware image encoding, in accordance with an embodiment of the disclosure.

FIG. 16 is a diagram that illustrates a graph showing results of content-aware image encoding, in accordance with an embodiment of the disclosure, in accordance with an embodiment of the disclosure. FIG. 16 is explained in conjunction with elements from FIGS. 1-10, 11A, 11B, and 13-15. With reference to FIG. 16, there is shown a bar graph 1600 that illustrates required bandwidth based on encoding of an image frame according to the coding technique described in FIGS. 7-9. The bandwidths are shown using bars with vertical hatching lines for the image frame having maximum foreground occupancy (e.g. 62% foreground, 38% background), and using bars with horizontal hatching lines for the image frame having maximum background occupancy (e.g. 15% foreground, 85% background). The X-axis of the bar graph 1600 represents different values of the quant divider 1302 of FIG. 13, and the Y-axis of the bar graph 1600 represents the required bandwidth for the image frame (or video) in Mbps.

As shown in FIG. 16, for the value of 1 of the quant divider 1302, the required bandwidth for the image frame having maximum background occupancy is 2.42 Mbps for the uncompressed image as compared to 2.24 Mbps, 2.08 Mbps, 1.88 Mbps, 1.60 Mbps, and 1.37 Mbps for compressed images corresponding to quant divider values of 1.5, 2, 3, 5, and 8, respectively, based on the compression according to the coding technique described in FIGS. 7-9. For the value of 1 of the quant divider 1302, the required bandwidth for the image frame having maximum foreground occupancy is 2.10 Mbps for the uncompressed image as compared to 2.02 Mbps, 1.96 Mbps, 1.89 Mbps, 1.80 Mbps, and 1.74 Mbps for compressed images corresponding to quant divider values of 1.5, 2, 3, 5, and 8, respectively, based on the compression according to the coding technique described in FIGS. 7-9. In the case of the image frame having maximum background occupancy, it may be observed that a significant reduction in the bandwidth required is achieved.

Figure 17:
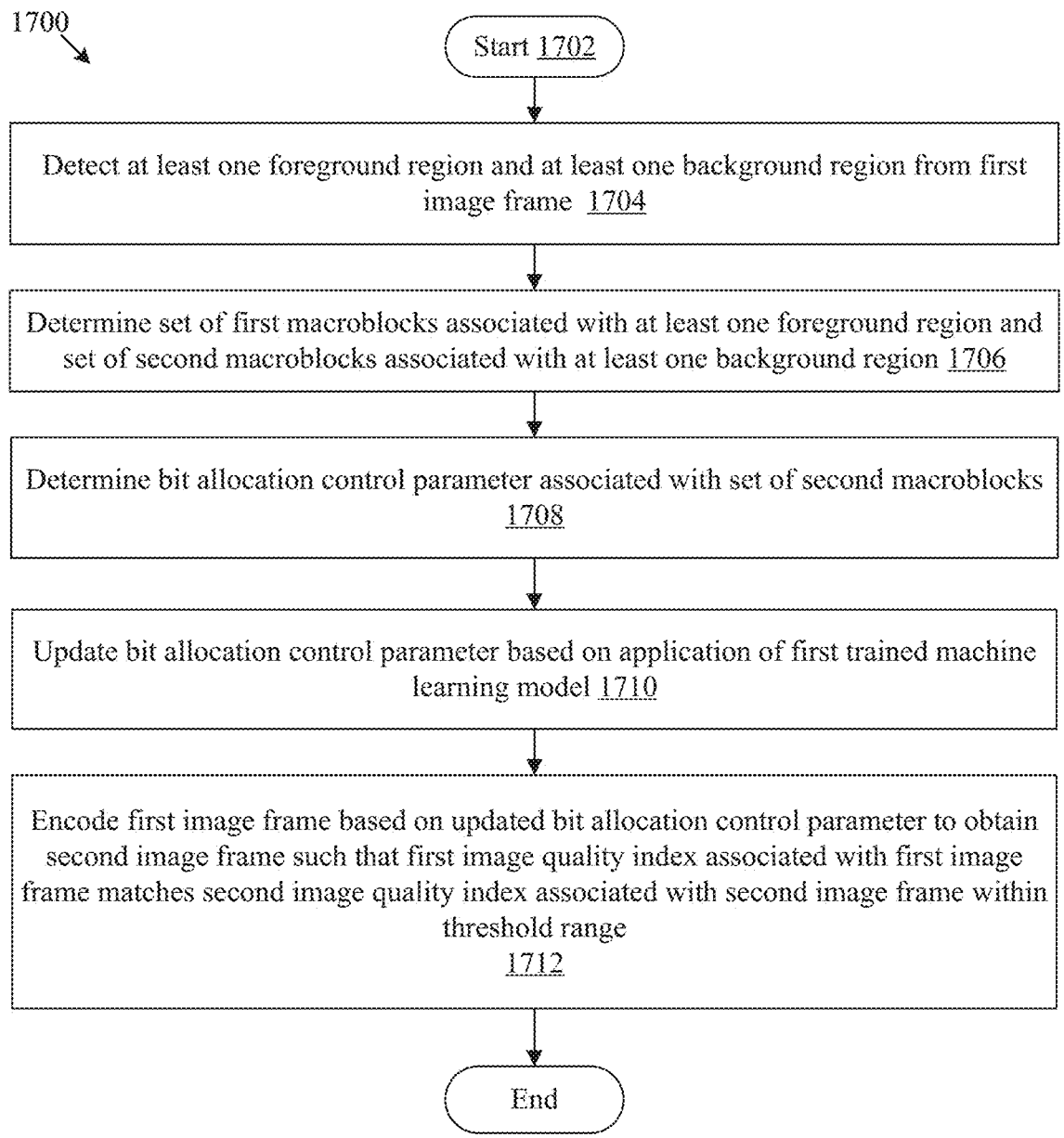
FIG. 17 illustrates an exemplary flowchart of a method for content-aware image encoding using a machine learning (ML) model, in accordance with an embodiment of the disclosure.

FIG. 17 illustrates an exemplary flowchart of a method for content-aware image encoding using a machine learning (ML) model, in accordance with an embodiment of the disclosure. FIG. 17 is described in conjunction with elements from FIGS. 1-10, 11A, 11B, and 12-16. With reference to FIG. 17, there is shown a flowchart 1700. The exemplary method of the flowchart 1700 may be executed by any computing system, for example, by the electronic device 104 of FIG. 1 or the circuitry 202 of FIG. 2. The exemplary method of the flowchart 1700 may start at 1702 and proceed to 1704.

At 1704, at least one foreground region and at least one background region may be detected from the first image frame (e.g. input image frame 102). In accordance with an embodiment, the circuitry 202 may be configured to detect the at least one foreground region and the at least one background region from the input image frame 102.

At 1706, a set of first macroblocks associated with the detected at least one foreground region and a set of second macroblocks associated with the detected at least one background region may be determined. In accordance with an embodiment, the circuitry 202 may determine, from the input image frame 102, the set of first macroblocks associated with the detected at least one foreground region and the set of second macroblocks associated with the detected at least one background region.

At 1708, a bit allocation control parameter associated with the set of second macroblocks may be determined. In accordance with an embodiment, the circuitry 202 may be configured to determine the bit allocation control parameter associated with the set of second macroblocks.

At 1710, the determined bit allocation control parameter may be updated based on an application of a first trained machine learning model 106. In accordance with an embodiment, the circuitry 202 may be configured to update the determined bit allocation control parameter associated with the determined set of second macroblocks based on the application of the first trained machine learning model 106.

At 1712, the first image frame may be encoded based on the updated bit allocation control parameter to obtain a second image frame (e.g. output image frame 108), such that a first image quality index associated with the first image frame matches a second image quality index associated with the second image frame within a threshold range. In accordance with an embodiment, the circuitry 202 may be configured to encode the input image frame 102 based on the updated bit allocation control parameter to obtain the output image frame 108, such that the first image quality index associated with the input image frame 102 matches the second image quality index associated with the output image frame 108 within the threshold range.

Although the flowchart 1700 is illustrated as discrete operations, such as 1704, 1706, 1708, 1710, and 1712, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions or instructions executable by a machine and/or a computer (for a device, such as the electronic device 104 or the circuitry 202). The instructions may cause the machine and/or computer to perform operations that may include detection of at least one foreground region and at least one background region from the first image frame (e.g. input image frame 102). The operations may further include determination, from the input image frame 102, a set of first macroblocks associated with the detected at least one foreground region and a set of second macroblocks associated with the detected at least one background region. The operations may further include determination of a bit allocation control parameter associated with the determined set of second macroblocks. The operations may further include updating the determined bit allocation control parameter associated with the determined set of second macroblocks based on an application of a first trained machine learning model 106. The operations may further include encoding the first image frame based on the updated bit allocation control parameter to obtain a second image frame (e.g. output image frame 108), wherein a first image quality index associated with the first image frame matches a second image quality index associated with the second image frame within a threshold range.

Exemplary aspects of the disclosure may include an electronic device (such as the electronic device 104). The electronic device 104 may include circuitry (such as the circuitry 202). The circuitry 202 may be configured to detect at least one foreground region and at least one background region from the first image frame (e.g. input image frame 102). The circuitry 202 may be further configured to determine, from the input image frame 102, a set of first macroblocks (such as the set of first macroblocks 102a) associated with the detected at least one foreground region and a set of second macroblocks (such as the set of second macroblocks 102b) associated with the detected at least one background region. The circuitry 202 may be further configured to determine a bit allocation control parameter associated with the determined set of second macroblocks. The circuitry 202 may be further configured to update the determined bit allocation control parameter associated with the determined set of second macroblocks based on an application of a first trained machine learning model (such as the first machine learning model 106). The circuitry 202 may be further configured to encode the first image frame based on the updated bit allocation control parameter to obtain a second image frame (such as the output image frame 108), wherein a first image quality index associated with the first image frame matches a second image quality index associated with the second image frame within the threshold range.

In accordance with an embodiment, the circuitry 202 may be further configured to detect a set of objects from the input image frame 102 based on an application of a second trained machine learning model (such as the second machine learning model 406) on the first image frame. The detected at least one foreground region may correspond to the detected set of objects, and the detected at least one background region may correspond to a region other than the detected at least one foreground region in the first image frame. In an embodiment, the electronic device may be configured to select at least one object of the detected set of objects as the at least one background region based on at least one of a user input or a system preference.

In accordance with an embodiment, the circuitry 202 may be further configured to determine a focal blur value associated with each region of a plurality of regions of the input image frame 102. The focal blur value associated with the detected at least one foreground region may be above a predetermined threshold, and the focal blur value associated with the detected at least one background region may be below the predetermined threshold. In accordance with an embodiment, the focal blur value may be determined based on an application of one of a Laplacian operator or any blur computing technique on the first image frame.

In accordance with an embodiment, the circuitry 202 may be further configured to determine a depth map associated with the first image frame. The circuitry 202 may be further configured to detect the at least one foreground region and the at least one background region based on a selective depth range in the determined depth map.

In accordance with an embodiment, the bit allocation control parameter may comprise a bit-rate control parameter that corresponds to at least one of an initial quantization parameter (QP), a QP limiter, a group of pictures (GOP) bit allocation, a basic unit bit allocation, or an entropy coding parameter, or any other bit occupancy control parameter.

In accordance with an embodiment, the bit allocation control parameter may comprise a quantization parameter. The circuitry may be further configured to determine, as the updated bit allocation control parameter, an updated quantization parameter between a minimum threshold quantization parameter and a default quantization parameter based on the application of the first trained machine learning model 106. The minimum threshold quantization parameter may be a quantization parameter value that maintains the second image quality index of the output image frame 108.

In accordance with an embodiment, each of the first image quality index and the second image quality index may correspond to a structural similarity index. The structural similarity index includes at least one of luminance information, contrast information, or structural information.

In accordance with an embodiment, the circuitry 202 may be further configured to control an execution of a set of operations (such as the set of operations 910-918 of FIG. 9) iteratively to update the determined bit allocation control parameter associated with the determined set of second macroblocks. The set of operations may include a reduction of the determined bit allocation control parameter to obtain a reduced bit allocation control parameter, wherein the reduction may be based on a predetermined fraction of the determined bit allocation control parameter, a generation of a third image frame based on the reduced bit allocation control parameter, a determination whether a third image quality index associated with the generated third image frame matches the first image quality index within the threshold range, and a selection of the reduced bit allocation control parameter as the determined bit allocation control parameter associated with the set of second macroblocks, based on the determination of a match between the third image quality index and the first image quality index.

In accordance with an embodiment, the circuitry 202 may be further configured to obtain the reduced bit allocation control parameter as the updated bit allocation control parameter and the generated third image frame as the output image frame 108, based on the iterative execution of the set of operations.

In accordance with an embodiment, the circuitry 202 may be further configured to determine a network bandwidth associated with a video stream. The video stream may include the first image frame. The circuitry 202 may be further configured to update of the bit allocation control parameter associated with the determined set of second macroblocks further based on a bit rate compatible with the determined network bandwidth. In accordance with an embodiment, the circuitry 202 may be further configured to compress the first image frame based on the updated bit allocation control parameter.

In accordance with an embodiment, the circuitry 202 may be further configured to select a file, from a set of files, stored in a memory device. The selected file may include an image or a video, and the input image frame 102 may correspond to the selected file. The circuitry 202 may be further configured to compress the selected file based on the encoding of the first image frame. In accordance with an embodiment, the selection of the file from the set of files may be based on a time of creation of the file, a time of modification of the file, one of a time or a frequency of access of the file, a user input associated with the file, or any other recommended criteria.

In accordance with an embodiment, the circuitry 202 may be further configured to detect a set of objects from the first image frame. The first image frame may correspond to a surveillance video that includes a set of image frames. The detected at least one foreground region may correspond to the detected set of objects, and the detected at least one background region may correspond to a region other than the detected at least one foreground region in the input image frame 102. In accordance with an embodiment, the circuitry 202 may be further configured to compress the surveillance video based on the encoding of the first image frame.

In accordance with an embodiment, the circuitry 202 may be further configured to track the detected set of objects in the set of image frames. The circuitry 202 may be further configured to control an image capture device associated with the surveillance video based on the tracking of the detected set of objects.

In accordance with an embodiment, the circuitry may be further configured to train a first machine learning model 1106 on a training dataset to obtain the trained first machine learning model 1108. In accordance with an embodiment, the training dataset may include a default quantization parameter associated with the set of second macroblocks, a modified quantization parameter associated with the set of second macroblocks, a foreground occupancy percentage in a set of image frames, a background occupancy percentage in the set of image frames, a quantization parameter divisor, a bit consumption associated with the set of second macroblocks, and an available network bandwidth for transmission of the first image frame.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that includes a portion of an integrated circuit that also performs other functions.

The present disclosure may also be embodied in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
  circuitry configured to:
    detect at least one foreground region and at least one background region from a first image frame;
    determine, from the first image frame, a set of first macroblocks associated with the detected at least one foreground region and a set of second macroblocks associated with the detected at least one background region;
    determine a bit allocation control parameter associated with the determined set of second macroblocks, wherein the bit allocation control parameter comprises a quantization parameter;
    update the determined bit allocation control parameter associated with the determined set of second macroblocks based on an application of a first trained machine learning model;
    determine, as the updated bit allocation control parameter, an updated quantization parameter between a minimum threshold quantization parameter and a default quantization parameter based on the application of the first trained machine learning model; and
    encode the first image frame based on the updated bit allocation control parameter to obtain a second image frame,
    wherein a first image quality index associated with the first image frame matches a second image quality index associated with the second image frame within a threshold range.

2. The electronic device according to claim 1, wherein the circuitry is further configured to detect a set of objects from the first image frame based on an application of a second trained machine learning model on the first image frame, wherein
  the detected at least one foreground region corresponds to the detected set of objects, and
  the detected at least one background region corresponds to a region other than the detected at least one foreground region in the first image frame.

3. The electronic device according to claim 1, wherein the circuitry is further configured to select at least one object of the detected set of objects as the at least one background region based on at least one of a user input or a system preference.

4. The electronic device according to claim 1, wherein the circuitry is further configured to determine a focal blur value associated with each region of a plurality of regions of the first image frame, wherein
the focal blur value associated with the detected at least one foreground region is above a threshold, and
the focal blur value associated with the detected at least one background region is below the threshold.

5. The electronic device according to claim 4, wherein the focal blur value is determined based on an application of one of a Laplacian operator or a blur computing technique on the first image frame.

6. The electronic device according to claim 1, wherein the circuitry is further configured to:
determine a depth map associated with the first image frame; and
detect the at least one foreground region and the at least one background region based on a selective depth range in the determined depth map.

7. The electronic device according to claim 1, wherein the bit allocation control parameter comprises a bit-rate control parameter that corresponds to at least one of: an initial quantization parameter (QP), a QP limiter, a group of pictures (GOP) bit allocation, a basic unit bit allocation, or an entropy coding parameter.

8. The electronic device according to claim 1, wherein
each of the first image quality index and the second image quality index corresponds to a structural similarity index, and
the structural similarity index includes at least one of luminance information, contrast information, or structural information.

9. The electronic device according to claim 1, wherein the circuitry is further configured to:
control an execution of a set of operations iteratively to update the determined bit allocation control parameter associated with the determined set of second macroblocks, wherein the set of operations includes:
a reduction of the determined bit allocation control parameter to obtain a reduced bit allocation control parameter, wherein the reduction is based on a fraction of the determined bit allocation control parameter,
a generation of a third image frame based on the reduced bit allocation control parameter,
a determination whether a third image quality index associated with the generated third image frame matches the first image quality index within the threshold range, and
a selection of the reduced bit allocation control parameter as the determined bit allocation control parameter associated with the set of second macroblocks, based on the determination of a match between the third image quality index and the first image quality index; and
obtain the reduced bit allocation control parameter as the updated bit allocation control parameter and the generated third image frame as the second image frame, based on the iterative execution of the set of operations.

10. The electronic device according to claim 1, wherein the circuitry is further configured to:
determine a network bandwidth associated with a video stream, wherein
the video stream includes the first image frame, and
the update of the bit allocation control parameter associated with the determined set of second macroblocks is further based on a bit rate compatible with the determined network bandwidth; and
compress the first image frame based on the updated bit allocation control parameter.

11. The electronic device according to claim 1, wherein the circuitry is further configured to:
select a file, from a set of files, stored in a memory device, wherein
the selected file includes an image or a video, and
the first image frame corresponds to the selected file; and
compress the selected file based on the encoded first image frame.

12. The electronic device according to claim 11, wherein the selection of the file from the set of files is based on a time of creation of the file, a time of modification of the file, one of a time or a frequency of access of the file, or a user input associated with the file.

13. The electronic device according to claim 1, wherein the circuitry is further configured to:
detect a set of objects from the first image frame, wherein
the first image frame corresponds to a surveillance video that includes a set of image frames, and
the detected at least one foreground region corresponds to the detected set of objects and the detected at least one background region corresponds to a region other than the detected at least one foreground region in the first image frame; and
compress the surveillance video based on the encoded first image frame.

14. The electronic device according to claim 1, wherein the circuitry is further configured to train a first machine learning model on a training dataset to obtain the first trained machine learning model, and
the training dataset includes a default quantization parameter associated with the determined set of second macroblocks, a modified quantization parameter associated with the determined set of second macroblocks, a foreground occupancy percentage in a set of image frames, a background occupancy percentage in the set of image frames, a quantization parameter divisor, a bit consumption associated with the determined set of second macroblocks, and an available network bandwidth for transmission of the first image frame.

15. A method, comprising:
in an electronic device:
determining a focal blur value associated with each region of a plurality of regions of a first image frame based on an application of one of a Laplacian operator or a blur computing technique on the first image frame;
detecting at least one foreground region and at least one background region from the first image frame based on the determined focal blur value, wherein
the focal blur value associated with the detected at least one foreground region is above a threshold, and
the focal blur value associated with the detected at least one background region is below the threshold;
determining, from the first image frame, a set of first macroblocks associated with the detected at least one foreground region and a set of second macroblocks associated with the detected at least one background region;
determining a bit allocation control parameter associated with the determined set of second macroblocks;

updating the determined bit allocation control parameter associated with the determined set of second macroblocks based on an application of a first trained machine learning model; and encoding the first image frame based on the updated bit allocation control parameter to obtain a second image frame, wherein a first image quality index associated with the first image frame matches a second image quality index associated with the second image frame within a threshold range.

16. The method according to claim 15, further comprising detecting a set of objects from the first image frame based on an application of a second machine learning model on the first image frame, wherein the detected at least one foreground region corresponds to the detected set of objects, and the detected at least one background region corresponds to a region other than the detected at least one foreground region in the first image frame.

17. The method according to claim 15, further comprising:

determining a depth map associated with the first image frame; and detecting the foreground region and the background region based on a selective depth range in the determined depth map.

18. A non-transitory computer-readable storage medium configured to stored thereon, computer-executable instructions which, when executed by an electronic device, cause the electronic device to execute operations, the operations comprising:

detecting at least one foreground region and at least one background region from a first image frame;

determining, from the first image frame, a set of first macroblocks associated with the detected at least one foreground region and a set of second macroblocks associated with the detected at least one background region;

determining a bit allocation control parameter associated with the determined set of second macroblocks, wherein the bit allocation control parameter comprises a quantization parameter;

updating the determined bit allocation control parameter associated with the determined set of second macroblocks based on an application of a first trained machine learning model;

determining, as the updated bit allocation control parameter, an updated quantization parameter between a minimum threshold quantization parameter and a default quantization parameter based on the application of the first trained machine learning model; and encoding the first image frame based on the updated bit allocation control parameter to obtain a second image frame, wherein a first image quality index associated with the first image frame matches a second image quality index associated with the second image frame within a threshold range.

19. An electronic device, comprising:
circuitry configured to:

detect at least one foreground region and at least one background region from a first image frame;

determine, from the first image frame, a set of first macroblocks associated with the detected at least one foreground region and a set of second macroblocks associated with the detected at least one background region;

determine a bit allocation control parameter associated with the determined set of second macroblocks;

control an execution of a set of operations iteratively to update the determined bit allocation control parameter associated with the determined set of second macroblocks based on an application of a first trained machine learning model, wherein the set of operations includes:

a reduction of the determined bit allocation control parameter to obtain a reduced bit allocation control parameter, wherein the reduction is based on a fraction of the determined bit allocation control parameter, a generation of a third image frame based on the reduced bit allocation control parameter, a determination whether a third image quality index associated with the generated third image frame matches a first image quality index within a threshold range, and a selection of the reduced bit allocation control parameter as the determined bit allocation control parameter associated with the set of second macroblocks, based on the determination of a match between the third image quality index and the first image quality index; and obtain the reduced bit allocation control parameter as an updated bit allocation control parameter and the generated third image frame as a second image frame, based on the iterative execution of the set of operations; and encode the first image frame based on the updated bit allocation control parameter to obtain the second image frame, wherein the first image quality index associated with the first image frame matches a second image quality index associated with the second image frame within the threshold range.

20. An electronic device, comprising:
circuitry configured to:

determine a focal blur value associated with each region of a plurality of regions of the first image frame, detect at least one foreground region and at least one background region from a first image frame based on the determined focal blur value, wherein the focal blur value associated with the detected at least one foreground region is above a threshold, and the focal blur value associated with the detected at least one background region is below the threshold;

determine, from the first image frame, a set of first macroblocks associated with the detected at least one foreground region and a set of second macroblocks associated with the detected at least one background region;

determine a bit allocation control parameter associated with the determined set of second macroblocks;

update the determined bit allocation control parameter associated with the determined set of second macroblocks based on an application of a first trained machine learning model; and encode the first image frame based on the updated bit allocation control parameter to obtain the second image frame, wherein the first image quality index associated with the first image frame matches a second image quality index associated with the second image frame within a threshold range.

* * * * *